United States Patent
Kamijo et al.

(10) Patent No.: US 7,667,708 B2
(45) Date of Patent: Feb. 23, 2010

(54) DISPLAY CONTROLLER, ELECTRONIC INSTRUMENT, AND METHOD OF SUPPLYING IMAGE DATA

(75) Inventors: Hirofumi Kamijo, Kunitachi (JP); Taketo Fukuda, Chofu (JP)

(73) Assignee: Seiko Epson Corporation (JP)

( * ) Notice: Subject to any disclaimer, the term of this patent is extended or adjusted under 35 U.S.C. 154(b) by 640 days.

(21) Appl. No.: 11/175,122

(22) Filed: Jul. 5, 2005

(65) Prior Publication Data

US 2006/0001671 A1 Jan. 5, 2006

(30) Foreign Application Priority Data

Jul. 5, 2004 (JP) ............... 2004-197611

(51) Int. Cl.
G06F 12/00 (2006.01)
G06F 12/02 (2006.01)

(52) U.S. Cl. ............... 345/531; 345/564; 345/565; 345/566

(58) Field of Classification Search ............... 345/565, 345/566

See application file for complete search history.

(56) References Cited

U.S. PATENT DOCUMENTS 5,319,786 A * 6/1994 Yamamura ............ 345/564
5,894,312 A * 4/1999 Ishiwata et al. ............ 345/504
2003/0210338 A1 * 11/2003 Matsuoka et al. ...... 348/231.99

FOREIGN PATENT DOCUMENTS

| JP | 06-105290 | 4/1994 |
|----|-----------|--------|
| JP | 06-154209 | 6/1994 |
| JP | 07-030809 | 1/1995 |
| JP | 11-039229 | 2/1999 |
| JP | 2000-070266 | 3/2000 |
| JP | 2003-224862 | 8/2003 |

* cited by examiner

Primary Examiner—Kee M Tung
Assistant Examiner—Jacinta Crawford
(74) Attorney, Agent, or Firm—Harness, Dickey & Pierce, P.L.C.

(57) ABSTRACT

A display controller includes a memory storing at least three frames of image data, a write starting address register to which a write starting address is set, a read starting address register to which a read starting address is set, and a rotation control section performing control for reading out from the memory image data corresponding to an image whose orientation is rotated. When writing of the image data to the area designated by the write starting address is completed, the write starting address is updated and the previous value of the updated write starting address is set to the read starting address register. The image data corresponding to the rotated image is read out by the rotation control section 40 from an area of the memory designated by the read starting address, and then supplied to a display driver.

18 Claims, 17 Drawing Sheets

| | | | | |
|---|---|---|---|---|
| AD | $R_{10}$ | $G_{10}$ | $B_{10}$ | $(P_{10})$ |
| AD+1 | $R_{11}$ | $G_{11}$ | $B_{11}$ | $(P_{11})$ |
| AD+2 | $R_{12}$ | $G_{12}$ | $B_{12}$ | $(P_{12})$ |
| AD+3 | $R_{13}$ | $G_{13}$ | $B_{13}$ | $(P_{13})$ → 1 |
| AD+4 | $R_{20}$ | $G_{20}$ | $B_{20}$ | $(P_{20})$ |
| AD+5 | $R_{21}$ | $G_{21}$ | $B_{21}$ | $(P_{21})$ |
| AD+6 | $R_{22}$ | $G_{22}$ | $B_{22}$ | $(P_{22})$ |
| AD+7 | $R_{23}$ | $G_{23}$ | $B_{23}$ | $(P_{23})$ → 2 |
| AD+8 | $R_{30}$ | $G_{30}$ | $B_{30}$ | $(P_{30})$ |
| | | | | → 3 |

ROTATIONAL ANGLE = 270 DEGREES, MIRROR FUNCTION = OFF

ROTATIONAL ANGLE = 180 DEGREES, MIRROR FUNCTION = ON

ROTATIONAL ANGLE = 180 DEGREES, MIRROR FUNCTION = OFF

ROTATIONAL ANGLE = 270 DEGREES, MIRROR FUNCTION = ON

DISPLAY CONTROLLER, ELECTRONIC INSTRUMENT, AND METHOD OF SUPPLYING IMAGE DATA

RELATED APPLICATIONS

This application claims priority to Japanese Patent Application No. 2004-197611 filed Jul. 5, 2004 which is hereby expressly incorporated by reference herein in its entirety.

BACKGROUND

1. Technical Field

The present invention relates to a display controller, an electronic instrument, and a method of supplying image data.

2. Related Art

In recent years, display panels represented by liquid crystal display (LCD) panels are often implemented to portable devices (electronic instruments, in a broad sense) such as mobile phones. The display panels are driven by display drivers in accordance with image data. The image data can be taken by, for example, camera modules, or generated and/or processed by host systems. The display drivers perform drive control of the display panels in accordance with the image data and sync signals for display.

The display controllers supply the image data and the sync signals for display as a substitute for the hosts to reduce processing loads of the hosts. Some display controllers are equipped with memory devices that function as video memories for the sake of low power consumption.

Incidentally, the portable device to be provided with the display panel houses a camera module, and is arranged to display the image taken by the camera module on the display panel. In this case, the image taken by the camera module is once stored in the memory of the display controller, and then supplied to the display driver.

However, the period of writing the image data from the camera module (writing rate) is not necessary match the period of reading the image data for supplying to the display driver (reading rate). Therefore, if the capacity of the memory in the display controller is no more than just for storing one frame of image data, the image data cannot be supplied to the display driver without lacking of the image data.

Further, the orientation of the image corresponding to the image data taken by the camera module is generally fixed. Therefore, the image data from the camera module is supplied to the display driver with the orientation of the image rotated in the display controller. However, if the orientation of the image is rotated for displaying the image in the display panel, the capacity of the memory in the display controller prepared as much as the amount corresponding to two frames is not sufficient. In this case, the area of the image data for one frame in the reading process is overwritten with the image data for the succeeding frame, thus degrading the quality of the image displayed on the display panel. Therefore, the memory of the display controller is required to have the capacity of at least three frames.

The present invention addresses the above technical requirement and has an advantage of providing a display controller, an electronic instrument, and a method of supplying image data each capable of supplying image data with no missing part thus preventing image degradation.

SUMMARY

In view of the above problems, one aspect of the present invention relates to a display controller for supplying image data to a display driver for driving a display panel, the display controller including a memory storing at least three frames of image data, a write starting address register to which a write starting address for writing image data in the memory is set, a read starting address register to which a read starting address register for reading out image data to be supplied to the display driver from the memory is set, and a rotation control section performing control for reading out image data obtained by rotating the orientation of an image by reading out image data for each pixel stored in the memory in an order corresponding to the rotational angle. In the above display controller, when writing of image data to the area designated by the write starting address is completed, the write starting address set in the write starting address register is updated with a write starting address for writing image data of the succeeding frame. And, in this display controller, the previous value of the updated write starting address is set to the read starting address register as the read starting address, and further, image data corresponding to the rotated image and read out by the rotation control section from an area of the memory designated by the read starting address is supplied to the display driver.

In this aspect, the rotation control section controls reading the image data obtained by rotating the orientation of the image by reading out, in an order corresponding to the rotational angle, the image data for each pixel stored in the memory. Accordingly, if one frame of writing area and one frame of reading area, totally two frames of area are prepared in the memory, the image data in the reading area cannot be updated unless reading of the one frame of image data is completed. Therefore, it is required that a storage capacity for another one frame is prepared, and a memory capable of storing at least three frames of image data is required.

According to this configuration, even in the rotation control, since the image data is read out from the area of the memory to which writing is completed, missing of the image data can be prevented.

Further, in the display controller according to one aspect of the invention, the read starting address does not need to be updated until reading of one frame of image data from the area of the memory designated by the read starting address is completed.

According to this aspect of the invention, since the read starting address is not updated until reading of one frame of image data from the area of the memory read by the rotation control section is completed, it can surely be prevented that the image data is read out from the updated area during the reading operation of the rotated image data.

Further, the display controller according to another aspect of the invention further includes a sync signal generation circuit for generating a vertical sync signal defining a scanning period of one frame, and if the image data is supplied to the display driver in sync with the vertical sync signal, the previous value of the updated write starting address can be set to the read starting address register as the read starting address in sync with the vertical sync signal upon completion of writing of the image data.

According to this aspect of the invention, the following case can surely be prevented. Namely, before reading of the image data for one whole frame is completed, image data is read out from another reading area, thus the image data of the one frame is mixed with the image data read out from another reading area.

Further, in the display controller according to still another aspect of the invention, providing the vertical sync signal becomes active at least two times after completion of writing of the image data, the previous value of the updated write starting address can be set to the read starting address register as the read starting address.

In this aspect of the invention, it is conceivable that it takes substantial time until setting of read starting address is completed. In the case in which setting of the updated value of the read starting address is completed by two or more times of access to the display controller, for example, if the content of a buffer is set to the read starting address register upon the completion of the first access, insufficient updated value is to be referred to as the read starting address. According to this aspect of the invention, the sufficient access time is provided, and the image data can surely be read out from the area of the memory to which writing is completed.

Further, in the display controller according to still another aspect of the invention, a rate of writing one frame of image data to the memory can be lower than a rate of reading out the rotated image data from the memory.

According to this aspect of the invention, the following case can surely be prevented. Namely, before reading of the image data for one whole frame is finished, the reading area is used as the writing area, thus the image data of the one frame is mixed with the image data overwritten thereto.

Further, in the display controller according to still another aspect of the invention, the write starting address is set in the write starting address register for each writing area of the memory. The writing area corresponds to a frame. And either one of the write starting addresses can be selected upon writing the image data.

According to this aspect of the invention, it is not necessary to access the writing area setting register to set the write starting address every time the write starting address is updated, thus the write starting address can quickly be updated without executing any unnecessary access.

Further, the display controller according to still another aspect of the invention includes a host interface performing an interfacing process with a host, and a first interrupt indicating completion of writing of the image data is reported to the host, and the previous value of the updated write starting address can be supplied as the read starting address by the host reported with the first interrupt via the host interface.

Further, in the display controller according to still another aspect of the invention, the updated write starting address can be supplied by the host reported with the first interrupt via the host interface.

Further, in the display controller according to still another aspect of the invention, a second interrupt indicating that the vertical sync signal becomes active is reported to the host, and providing the first and the second interrupts are reported, the previous value of the updated write starting address can be supplied as the read starting address by the host via the host interface.

Further, the display controller according to still another aspect of the invention can further include a display driver interface for supplying the display driver with image data read out from the memory.

Further, still another aspect of the invention relates to an electronic instrument including a display panel, either one of the above display controllers, and a display driver for driving the display panel in accordance with image data supplied by the display controller.

Further, the electronic instrument according to still another aspect of the invention can further include a host inputting image data from the display controller or outputting image data to the display controller.

According to this aspect of the invention, an electronic instrument capable of supplying image data without any missing parts to prevent degradation of the image quality can be provided.

Further, still another aspect of the invention relates to a method of supplying image data to a display driver for driving a display panel, including the step of writing image data to a part of an area of a memory storing at least three frames of image data, the part of the area being designated by a write starting address set in a write starting address register, the step of setting the write starting address to a read starting address register upon completion of writing of the image data, the read starting address register storing a read starting address for reading out from the memory image data to be supplied to the display driver, and the step of reading out image data of each pixel from an area of the memory designated by the read starting address set in the read starting address register in an order corresponding to a rotational angle to supply to the display driver as rotated image data obtained by rotating the orientation of an image.

Further, in the method of supplying image data according to still another aspect of the invention, the read starting address does not need to be updated until reading of one frame of image data from the area of the memory designated by the read starting address is completed.

Further, in the method of supplying image data according to still another aspect of the invention, if the image data is supplied to the display driver in sync with the vertical sync signal defining a scanning period of one frame, the write starting address can be set to the read starting address register as the read starting address in sync with the vertical sync signal upon completion of writing of the image data.

Further, in the method of supplying image data according to still another aspect of the invention, when the vertical sync signal becomes active at least two times after completion of writing of the image data, the write starting address can be set to the read starting address register as the read starting address.

Further, in the method of supplying image data according to still another aspect of the invention, a rate of writing one frame of image data to the memory can be lower than a rate of reading out the rotated image data from the memory.

DETAILED DESCRIPTION

Hereinafter, an embodiment of the present invention is described in detail with reference to the accompanying drawings. Note that the embodiment described below does not unreasonably limit the content of the present invention as claimed in the claim section. Further, not all of the components of the configuration described below are essential elements of the present invention.

Figure 1:
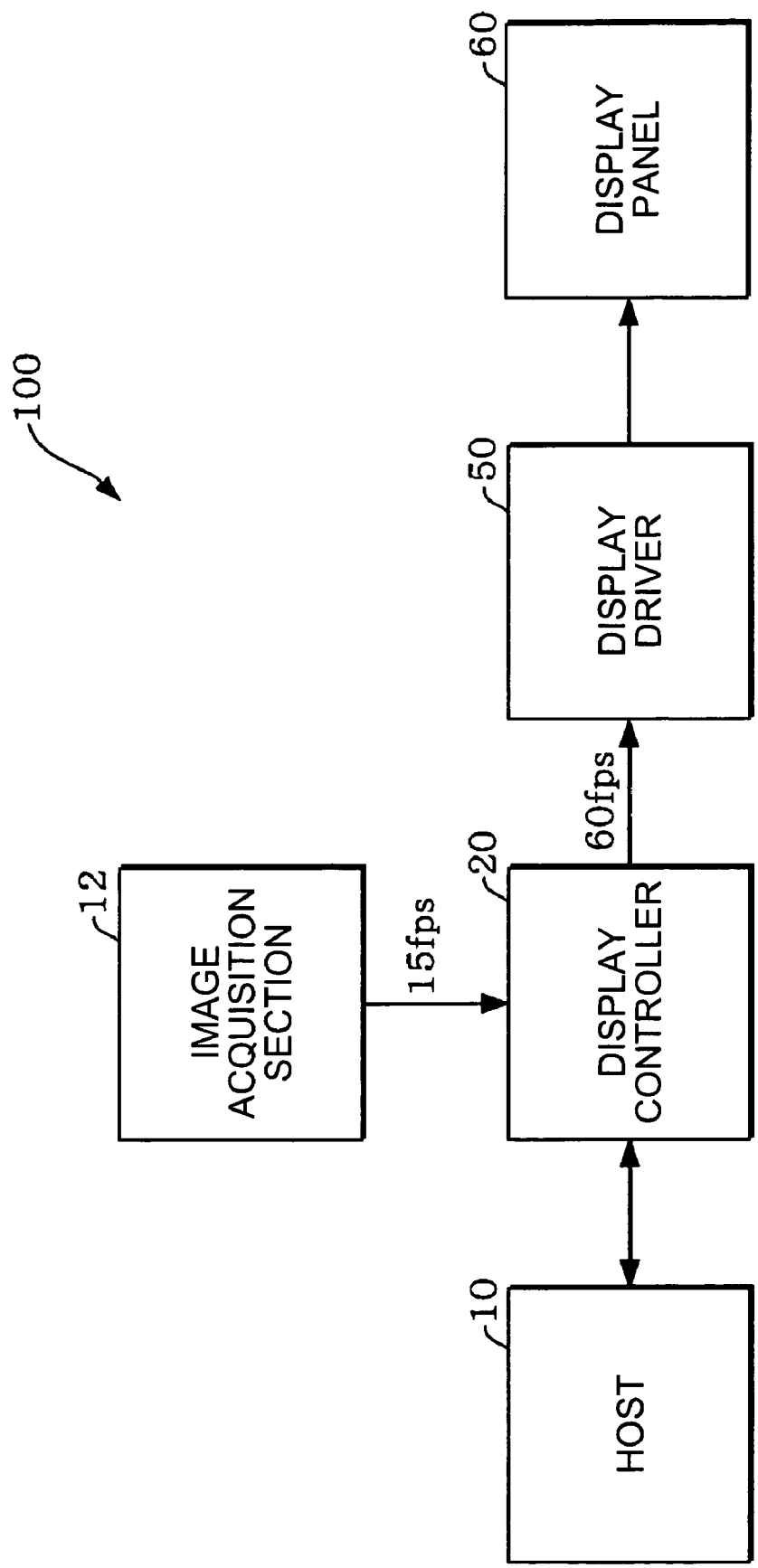
FIG. 1 is a block diagram of a configuration example of a display system applying a display controller according to the present embodiment.

FIG. 1 shows a configuration example of a display system applying a display controller according to the present embodiment of the invention. The display system shown in FIG. 1, for example, is implemented in an electronic instrument.

The display system 100 includes a host 10, an image acquisition section (an image pickup section, in a narrow sense) 12, a display controller 20, a display driver 50, and a display panel 60. The host 10 includes a CPU (Central Processing Unit) and a memory, wherein a predetermined function is realized by the CPU reading a program stored in the memory and executing a process corresponding to the program. Here, the host 10 generates or processes image data corresponding to an image to be displayed on the display panel 60, and then supplies it to the display controller 20.

As the image acquisition section 12, a camera module having an image pickup element, for example, can be adopted. The image data taken by acquisition in the image data acquisition section 12 is supplied to the display controller 20. The display controller 20 is able to supply the display driver 50 for driving the display panel 60 with image data from the host 10 or image data acquired by the image data acquisition section 12, or the image data obtained by processing these image data.

The image data from the image data acquisition section 12 is supplied to the display controller 20 at a rate of, for example, 15 frames per second (fps). The display controller 20 supplies the image data to the display driver 50 at a rate of, for example, 60 fps.

The display driver 50 is able to drive the display panel 60 in accordance with the image data from the display controller 20. As the display panel 60, for example, a LCD panel of an active matrix type or of a simple matrix type can be adopted.

As described above, the display controller 20 is provided between the host 10 and the display driver 50, and the processing load of the host 10 can be reduced by the display controller 20 executing, for example, processing of image data for host 10.

Display Controller

Figure 2:
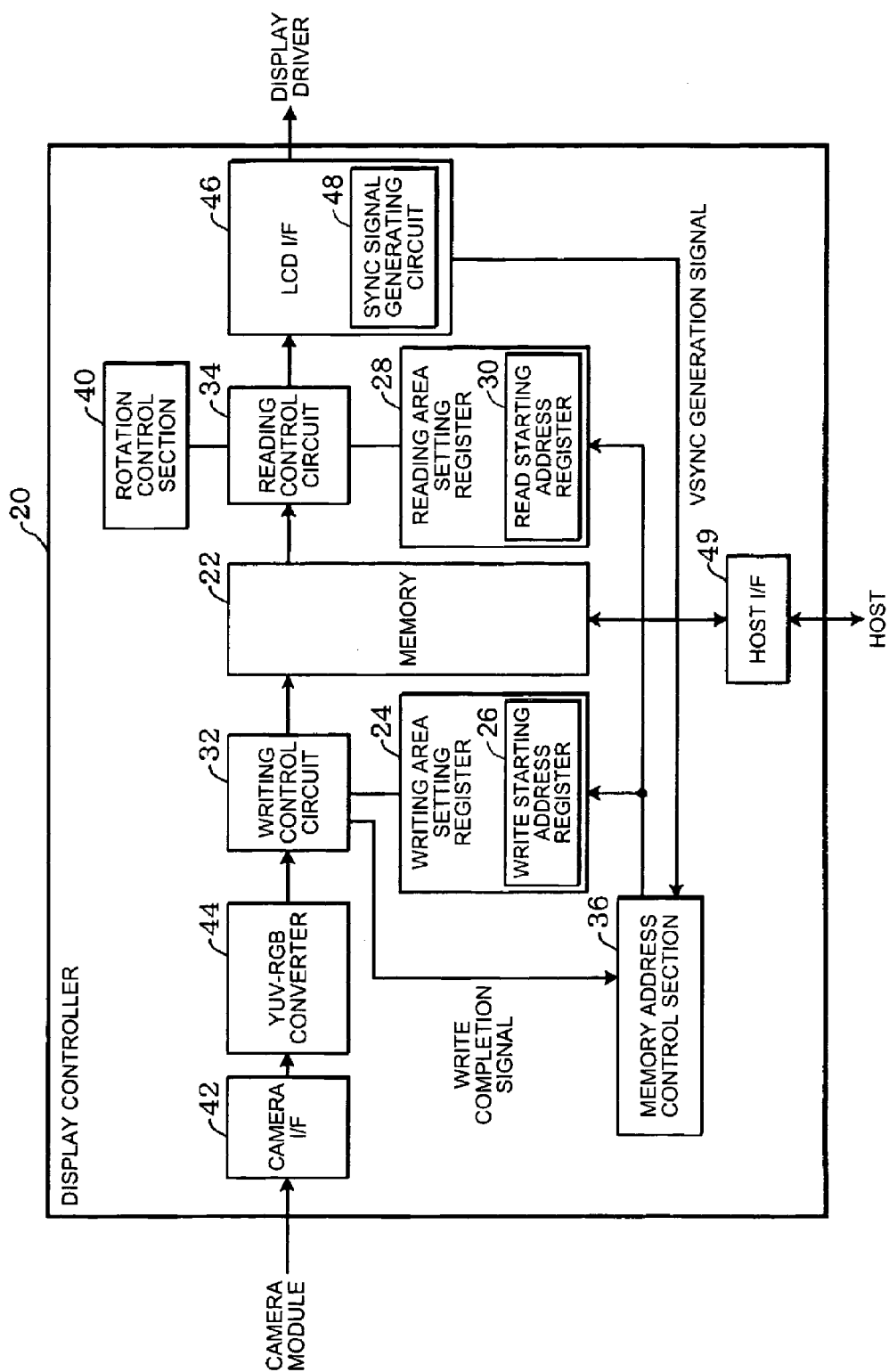
FIG. 2 is a block diagram of a configuration example of a display controller of the present embodiment.

FIG. 2 shows a block diagram of a configuration example of a display controller 20 according to the present embodiment.

The display controller 20 includes a memory 22 functioning as a video memory. The memory 22 stores at least three frames of image data. The memory 22 stores image data from a camera module as the image acquisition section not shown, or image data from the host not shown. The image data is read out from the memory 22 in accordance with the display rate of the display panel, and is supplied to the display driver not shown.

The display controller 20 includes a writing area setting register 24 and a reading area setting register 28.

In the writing area setting register 24, information used for setting the writing area of the image data to be written to the memory 22 is stored. The writing area setting register 24 includes a write starting address register 26 for storing a write starting address for writing the image data to the memory 22. In the writing area setting register 24, the size of the writing area is stored in addition to the write starting address.

In the reading area setting register 28, information used for setting the reading area of the image data to be read out from the memory 22 is stored. The reading area setting register 28 includes a read starting address register 30 for storing a read starting address for reading out the image data from the memory 22. In the reading area setting register 28, the size of the reading area is stored in addition to the read starting address.

The display controller 20 includes a writing control circuit 32, a reading control circuit 34, and memory address control section 36. The writing control circuit 32 controls writing the image data to the memory 22 in accordance with the information stored in the writing area setting register 24. The reading control circuit 34 controls reading out the image data from the memory 22 in accordance with the information stored in the reading area setting register 28. The memory address control section 36 controls updating the value stored in the writing area setting register 24 (the write starting address register 26) and the value stored in the reading area setting register 28 (the read starting address register 30).

Although the writing control circuit 32 writes the image data from the camera module into the memory 22 in FIG. 2, image data from the host can also be written in the memory 22 by a circuit having a configuration similar to the writing area setting register 24 and the writing control circuit 32. Further, although the reading control circuit 34 reads out the image data from the memory 22 to supply it to the display driver in FIG. 2, image data to be supplied to the host can also be read out from the memory 22 by a circuit having a configuration similar to the reading area setting register 28 and the reading control circuit 34.

Still further, the display controller 20 includes a rotation control section 40. The rotation control section 40 controls reading of the image data obtained by rotating the orientation of the image by reading out, in an order corresponding to the rotational angle, the image data for each pixel stored in the memory 22. The rotation control section 40 controls the reading control circuit 34 to read out the image data after the rotation.

And then, in the display controller 20, the image data is read out at a predetermined display rate from the reading area of the memory 22 designated by the read starting address stored in the read starting address register 30. In this case, the image data thus rotated and read out by the rotation control section 40 is supplied to the display driver.

In this case, it is desirable to supply the display driver 50 with the rotated image data without updating the setting value of the read starting address register 30 until reading of the image data of one frame from the area of the memory 22 designated by the read starting address register 30.

In the present embodiment, when the writing control section 32 finishes to write the image data to the area designated by the write starting address, the memory address control section 36 updates the write starting address set in the write starting address register 26 to the write starting address for writing the image data for the succeeding frame. Further, the memory address control section 36 stores the previous value of the updated write starting address in the read starting address register 30 as the read starting address.

Image data of a YUV format is input to the display controller 20 from a camera module not shown at a rate of 15 frames per second. Therefore, the display controller 20 can include a camera interface (I/F) circuit (an image data inputting interface, in a broad sense) 42 and a YUV-RGB converter 44.

The image data of the YUV format from the camera module is input to the camera I/F circuit 42. The camera I/F circuit 42 performs an interfacing process (a receiving process with the camera module or buffering of signals) of the image data, and outputs the interfacing processed image data to the YUV-RGB converter 44.

The YUV-RGB converter 44 converts image data of the YUV format into image data of the RGB format. More specifically, image data of either one of YUV 4:4:4 format, YUV 4:2:2 format, YUV 4:2:0 format, and YUV 4:1:1 format is converted to image data of either one of RGB 8:8:8 format, RGB 5:6:5 format, and RGB 3:3:2 format. The image data converted to the RGB format by the YUV-RGB converter 44 is then written by the writing control section 32 to the writing area in the memory 22 set by the writing area setting register 24.

And then, in order to supply the image data written in memory 22 to the display driver 50, the display controller 20 can include a LCD I/F circuit (a display driver interface, in a broad sense) 46.

The LCD I/F circuit 46 outputs the image data read out form the memory 22 by the reading control circuit 34 to the display driver 50. The LCD I/F circuit 46 performs an interfacing process (a receiving process with the display driver or buffering of signals) of the image data, and outputs the interfacing processed image data to the display driver 50. The LCD I/F circuit 46 includes a sync signal generating circuit 48, and is able to generate display sync signals (a vertical sync signal VSYNC for defining one vertical scanning period which is a scanning period of one frame, a horizontal sync signal HSYNC for defining one horizontal scanning period, a dot clock DCLK, and so on) for driving the display panel 60, and to supply the sync signals to the display driver 50. In this case, the LCD I/F circuit 46 outputs the image data of each frame in sync with the vertical sync signal, and the image data of each pixel in sync with the dot clock DCLK.

In this case, when writing of one frame of image data to the writing area is completed, the previous value of the updated write starting address is read out and stored in the read starting address register 30 as the read starting address in sync with the vertical sync signal VSYNC generated by the sync signal generating circuit 48.

By thus processed, the following case can surely be prevented. Namely, before reading of the image data for one whole frame is finished, image data is read out from another reading area, thus the image data of the one frame is mixed with the image data read out from another reading area.

Note that, although the LCD I/F circuit 46 is configured to include the sync signal generating circuit 48 in FIG. 2, a configuration in which the sync signal generating circuit 48 is disposed outside the LCD I/F circuit 46 can also be adopted.

Further, the rate of writing one frame of image data to the memory 22 is preferably lower than the rate of reading out from the memory 22 the image data rotated by the rotation control section 40.

By thus processed, the following case can surely be prevented. Namely, before reading of the image data for one whole frame is finished, the reading area is used as the writing area, thus the image data of the one frame is mixed with the image data overwritten thereto.

Further more, providing the vertical sync signal VSYNC becomes active at least two times after completion of the image data writing, the previous value of the updated write starting address can be read out and stored in the read starting address register 30 as the read starting address. If the read starting address is updated by external devices such as the memory address control section 36 or the host 10 or the like, it is conceivable that it takes substantial time until setting of the read starting address register 30 is completed. In the case in which setting of the updated value of the read starting address is completed by two or more times of access to a buffer (not shown) of the display controller 20, for example, if the content of the buffer is set to the read starting address register 30 at the completion of the first access, insufficient updated value is to be referred to as the read starting address. Therefore, by updating the read starting address on the condition that the vertical sync signal VSYNC becomes active at least two times, sufficient access time can be provided, and thus the image data can surely be read out from an area of the memory 22 to which writing has been completed.

With respect to such a display controller 20, the host 10 is able to write image data in the memory 22 and to read out image data from the memory 22. Therefore, the display controller 20 includes a host I/F circuit (a host interface, in a broad sense) 49. Image data input from the host 10 via the host I/F circuit 49 is written to the memory 22 by the writing control circuit not shown.

Further, to the host I/F circuit 49, the image data from the host 10 is input. In this case, the host I/F circuit 49 performs an interfacing process (a receiving process with the host or buffering of signals), and supplies the interfacing processed image data to the memory 22. Further, it is arranged that the image data read out from the memory 22 by the reading control circuit not shown can be supplied to the host 10 via the host I/F circuit 49. In this case, the host I/F circuit 49 performs an interfacing process (a transmitting process with the host or buffering of signals), and outputs the interfacing processed image data to the host 10.

According to the present embodiment, if the image data of an image whose orientation is rotated by the rotation control process of the rotation control section 40 is read out for displaying the image on the display panel 60, it is prevented that the reading area is overwritten with other image data. Therefore, the image data can be supplied without any missing parts. This point will be explained in the following section.

Figures 3, 4:
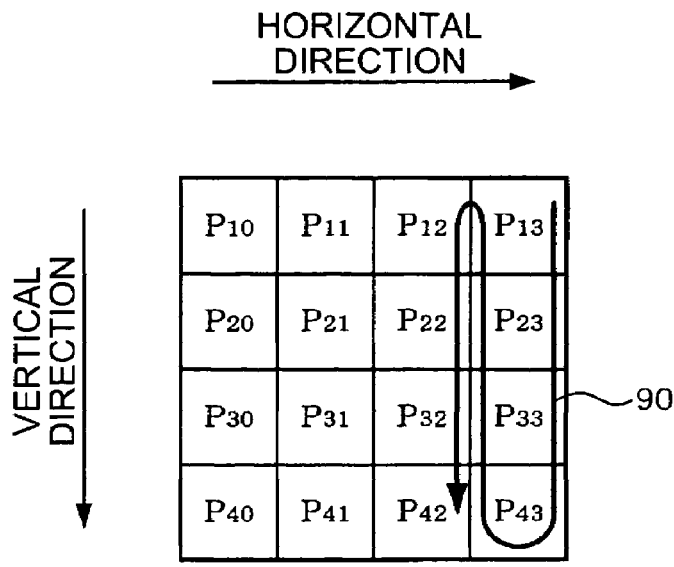
FIG. 3 is a schematic view for explaining one example of image data.
FIG. 4 is a schematic view for explaining an example of storing the image data of FIG. 3 in a memory.

FIG. 3 shows one example of the image data.

FIG. 4 shows a schematic diagram for explaining an example of storing the image data shown in FIG. 3 in the memory 22.

In FIG. 3, the image data of the image having four pixels aligned in the horizontal direction and four pixels aligned in the vertical direction is shown only for simplifying the explanation. And, the pixel values of the pixels aligned in the horizontal direction of the image are stored in the memory 22 in the order along the vertical direction.

Namely, the pixel values of pixels aligned in the horizontal direction $P_{10}, P_{11}, P_{12}, P_{13}, \ldots, P_{40}, P_{41}, P_{42}, P_{43}$ are sequentially stored in the storing area of the memory 22 designated by the incremented address. Therefore, as shown in FIG. 4, the pixel value $P_{10}$ (data of each of RGB components: $R_{10}$, $G_{10}, B_{10}$) is stored in the address of AD of the memory 22, the pixel value $P_{11}$ (data of each of RGB components: $R_{11}, G_{11}$, $B_{11}$) is stored in the address of (AD+1), . . . , the pixel value $P_{30}$ (data of each of RGB components: $R_{30}, G_{30}, B_{30}$) is stored in the address of (AD+8), . . . , and so on.

Here, if the image data is read out in the order of storing to the memory 22 without rotating the image orientation of the image data, the pixel values of $P_{10}, P_{11}, P_{12}, P_{13}, \ldots, P_{40}, P_{41}$, $P_{42}, P_{43}$ can be read out in this order. In this case, the pixel values are read out from the memory 22 of the addresses AD, (AD+1), (AD+2), . . . , in this order.

Incidentally, if the orientation of the image of the image data is rotated 90 degrees counter clockwise, for example, the pixel values are read out in the order along the arrow 90 shown in FIG. 3, namely in the order of $P_{13}, P_{23}, P_{33}, P_{43}, P_{12}, P_{22}$, $P_{32}, P_{42}, P_{11}, \ldots, P_{10}, P_{20}, P_{30}, P_{40}$. This is because each of the pixels needs to be rearranged in accordance with the horizontal scanning direction of the display panel 60. In this case, the pixel values are read out from the memory 22 of the addresses (AD+3), (AD+7), . . . , in this order. Although the case in which the orientation of the image of the image data is rotated 90 degrees counter clockwise is explained in FIGS. 3 and 4, in the cases of rotating 90, 180, or 270 degrees clockwise or counter clockwise, the orientation of the image of the image data can be rotated in the same manner by reading out the image data of each of the pixels stored in the memory 22 in the order corresponding to each if the rotational angles.

However, unlike with the case in which the image data is read out in the order of storing to the memory 22, before reading out of the image data of one frame in an order corresponding to the rotational angle is completed, the image data of the frame cannot be rewritten. This is because even if the pixel values $P_{13}, P_{23}, \ldots$, are read out in this order, for example, reading of the pixel values $P_{10}, P_{11}, P_{12}, P_{20}, P_{21}$, and $P_{22}$ is not yet finished. Accordingly, if one frame of writing area and one frame of reading area, totally two frames of area are prepared in the memory 22, the image data in the reading area cannot be updated unless reading of the one frame of image data is completed. Therefore, additional capacity for one more frame is necessary to be prepared.

As described above, since at least three frames of image data are stored in the memory 22 in the present embodiment, missing of the image data can be prevented even in the rotation control cases.

Note that the write starting addresses each corresponding to one of the writing areas of the respective frames in the memory 22 can be set in the write starting address register 26.

Figure 5:
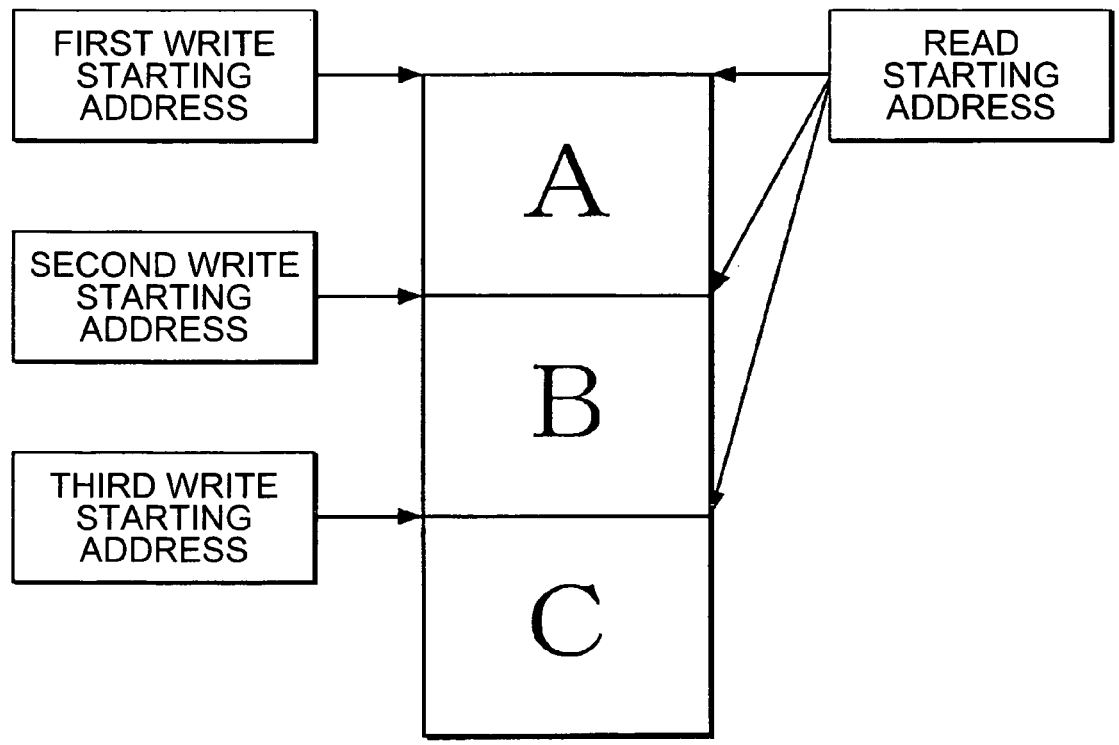
FIG. 5 is a schematic view for explaining write starting addresses each provided to respective one of writing areas.

FIG. 5 shows a schematic diagram for explaining the write starting addresses each provided for respective one of the writing areas.

FIG. 5 shows the case in which three frames of writing areas A, B, and C are prepared in an area of the memory 22.

Therefore, a first through a third write starting addresses are set in the write starting address register 26. As the first write starting address, the starting address of the writing area A is set. As the second write starting address, the starting address of the writing area B is set. As the third write starting address, the starting address of the writing area C is set. And, one of the first through the third write starting addresses is selected on the image data writing.

By thus processed, there is no need to access the writing area setting register 42 to set the write starting address every time the write starting address is updated. Therefore, the write starting address can be updated by only selecting either one of the predetermined plurality of write starting addresses. Thus, the write starting address can quickly be changed without any processing loads. Even when a very little blank period is included in the image data from the camera module and sufficient time is not provided for access from the outside, for example, the write starting address can surely be changed.

Note that, although the write starting address is set for each of the writing areas in FIG. 5, it can also be arranged that the read starting addresses each corresponding to one of the reading areas are set, and either one of the read starting addresses is used on the reading operation.

Figure 6:
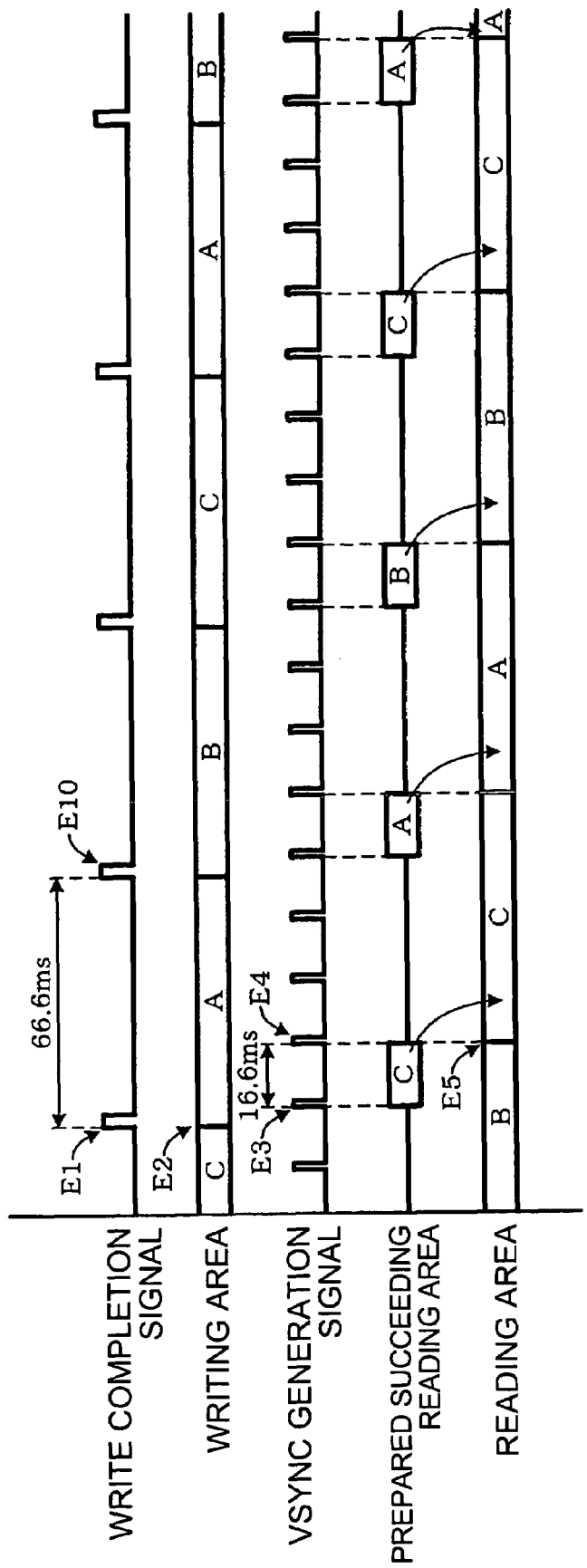
FIG. 6 is a timing chart of an operational example of a display controller of the present embodiment.

FIG. 6 shows a timing chart of an operational example of the display controller 20 according to the present embodiment.

Here, it is assumed that the image data is written to the memory 22 from the camera module at a rate of 15 fps, and the image data is read out from the memory 22 at a rate of 60 fps.

The writing control circuit 32 generates pulses of a write completion signal, which shows that writing of one frame of image data to the writing area of the memory 22 is completed, in every 66.6 (=1000/16) millisecond. The write completion signal is input to the memory address control section 36.

Further, the sync signal generation circuit 48 generates pulses of a VSYNC generation signal, which shows that the vertical sync signal VSYNC for displaying becomes active, in every 16.6 (=1000/60) millisecond. The VSYNC generation signal is also input to the memory address control section 36.

As shown in FIG. 5, the writing areas A, B, and C of the memory 22 are respectively provided. When writing of one frame of image data to the writing area C is completed, the pulse E1 of the write completion signal is generated. In response to the pulse E1 of the write completion signal, the memory address control section 36 changes the setting of the writing area to the area A (E2). More specifically, the memory address control section 36 sets the starting address of the area A previously provided as a succeeding writing area to the write starting address register 26.

In response to a pulse E3 of the VSYNC generation signal generated immediately after the generation of the pulse E1 of the write completion signal, the writing area C to which writing is completed is prepared in a buffer not shown or the like as the succeeding reading area. And, in response to the pulse E4 of the VSYNC generation signal succeeding to the pulse E3 of the VSYNC generation signal, the memory address control section 36 changes the setting of the reading area to the area C (E5). Namely, the write starting address of the prepared writing area C is set in the read starting address register 30 as the succeeding read starting address.

Note that, if the succeeding reading area can quickly be prepared, the write starting address of the writing area C can be set to the read starting address register 30 as the succeeding read starting address in response to the pulse E3 of the VSYNC generation signal generated immediately after the generation of the pulse E1 of the write completion signal.

After the read starting address register 30 is updated, the image data from the reading area C is repeatedly output to the display driver 50 until reading of the one frame of image data from the reading area C designated by the read starting address is completed. Note that, since the rate of writing one frame of image data to the memory 22 is lower than the rate of reading out the rotated image data from the memory 22 in FIG. 6, the reading area is not updated until the succeeding write completion signal pulse E10 is generated.

According to the above processes, the area to which writing is completed is sequentially updated as the reading area.

In the following section, a configuration example of a substantial part of the display controller 20 will be explained.

Figure 7:
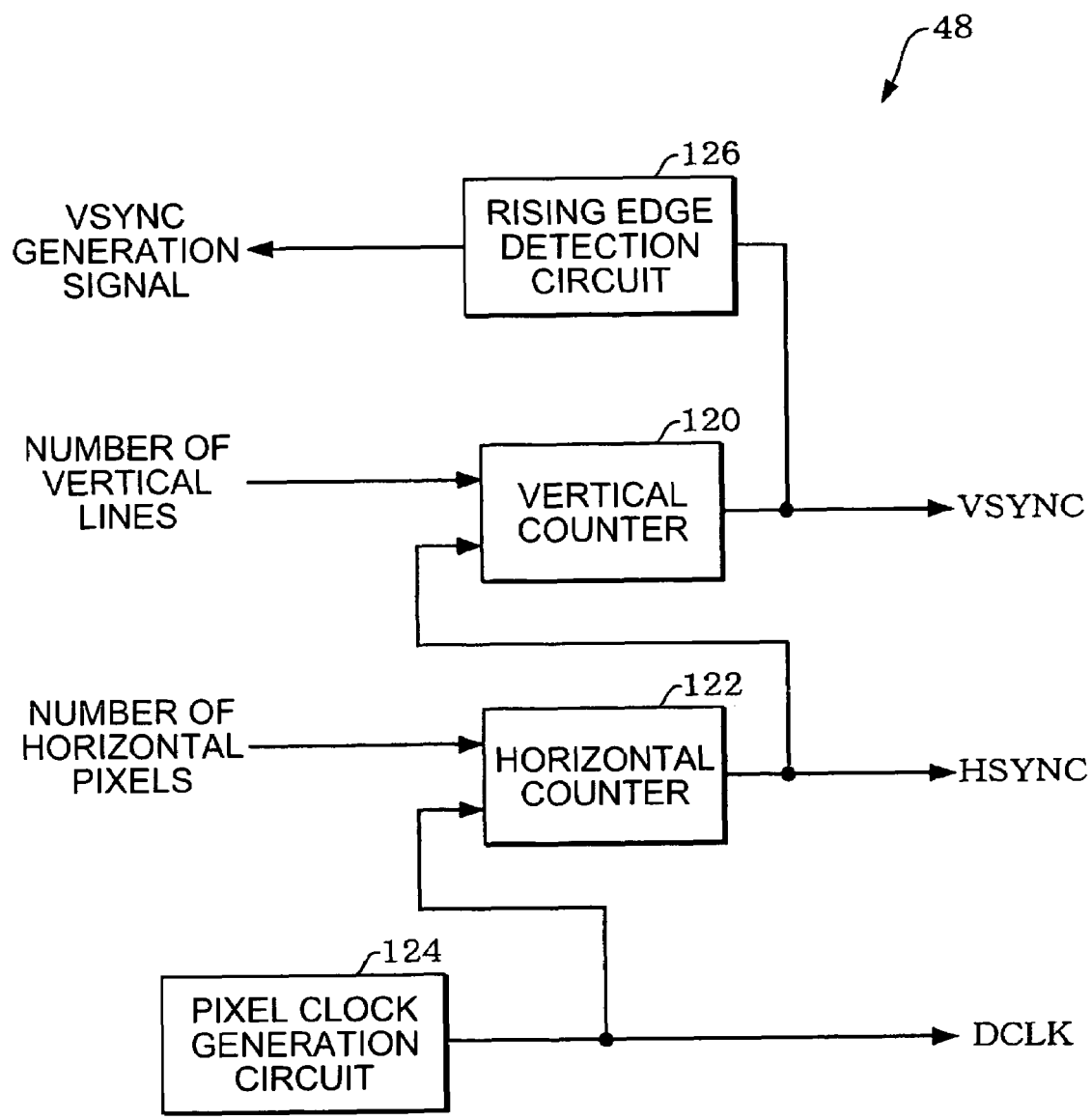
FIG. 7 is a block diagram of a configuration example of a sync signal generation circuit shown in FIG. 2.

FIG. 7 shows a configuration example of the sync signal generation circuit 48 shown in FIG. 2.

The sync signal generation circuit 48 includes a vertical counter 120, a horizontal counter 122, and a pixel clock generation circuit 124.

The vertical counter 120 counts horizontal sync signals HSYNC generated by the horizontal counter 122, and continues outputting the H level of vertical sync signal VSYNC until the count value becomes equal to the number of vertical lines. The horizontal counter 122 counts the dot clock signals (pixel clock signals) DCLK generated by the pixel clock generation circuit 124, and continues outputting the H level of horizontal sync signal HSYNC until the count value becomes equal to the number of horizontal pixels. The pixel clock generating circuit 124 outputs the dot clock DCLK obtained by dividing the given reference clock.

The display controller 20 includes a control register not shown, to which the host 10 is able to set the setting value thereof, to allow the host 10 to set the number of the vertical lines and the number of the horizontal pixels of FIG. 7 to the control register.

Further, the sync signal generation circuit 48 includes rising edge detection circuit 126. The rising edge detection circuit 126 outputs the VSYNC generation signal having a pulse that becomes active in response to the rising edge of the vertical sync signal VSYNC generated by the vertical counter 120.

Figure 8:
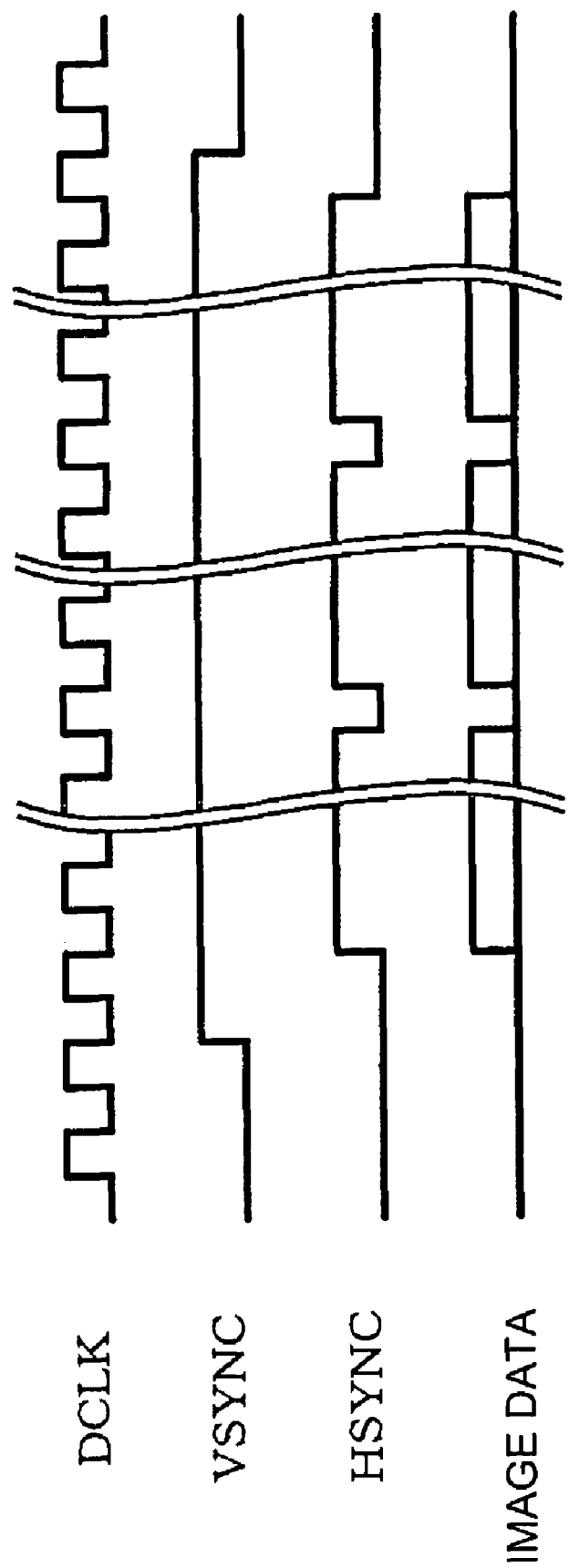
FIG. 8 is a timing chart showing an example of a timing relationship between the dot clock, the vertical sync signal, the horizontal sync signal, and the image data.

FIG. 8 shows an example of a timing relationship between the dot clock, the vertical sync signal, the horizontal sync signal, and the image data.

The vertical sync signal is a signal for defining one vertical scanning period, wherein the period in which the vertical sync signal is in the H level is defined as one vertical scanning period. The horizontal sync signal is a signal for defining one horizontal scanning period, wherein the period in which the horizontal sync signal is in the H level is defined as one horizontal scanning period. During the one horizontal scanning period, the image data of each pixel is output to the display driver 50 in sync with the dot clock DCLK.

The rotation control according to the present embodiment is hereinafter described.

Figure 9:
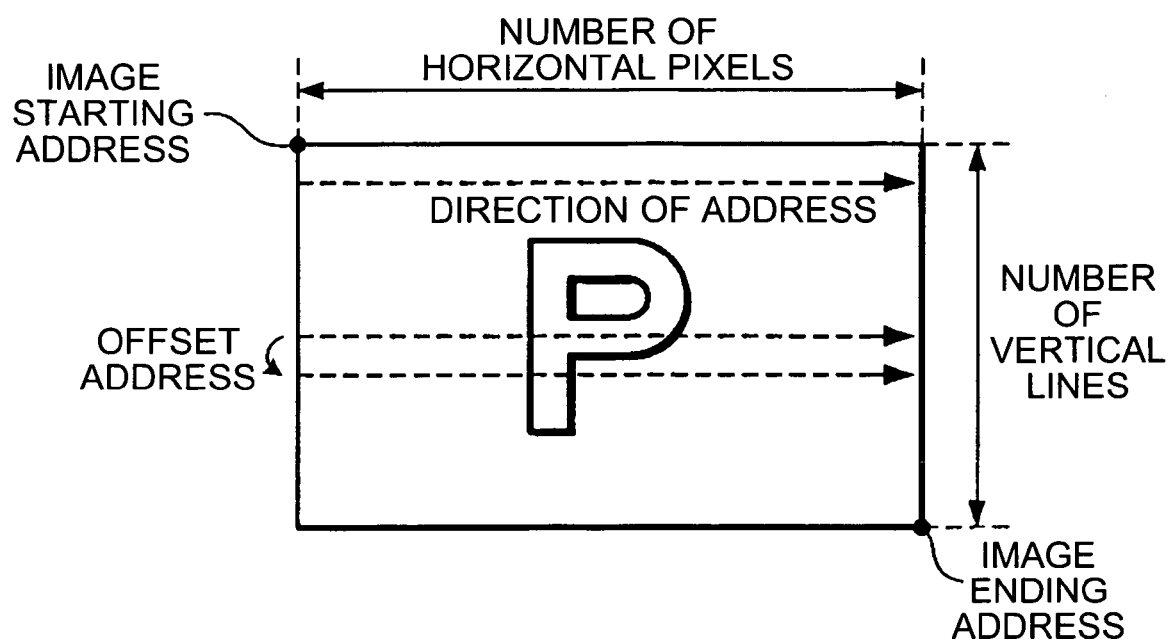
FIG. 9 is a schematic view for explaining rotation control executed by a rotation control section shown in FIG. 2.

FIG. 9 shows a schematic diagram for explaining the rotation control performed by the rotation control section 40 shown in FIG. 2.

In the following sections, it is assumed that the rotation control section 40 is able to designate only 0 degree, 90 degree, 180 degree, or 270 degree as a rotational angle, and is also able to further designate whether or not the mirror reflection is executed with respect to each of the rotational angles. The rotation control section 40 is able to control reading of the image data obtained by rotating the orientation of the image of the image data around a predetermined reference point in accordance with a rotational angle. Further, the rotation control section 40 is also able to control reading of the image data processed in a mirror reflection manner so that the horizontal aligning direction of the pixels of the image of the image data and the horizontal aligning direction of the pixels of the image not processed are opposite to each other.

The image data of each of the pixels is stored in the storage area of the memory 22 corresponding to the image starting address through the image ending address. The number of pixels of the image in the horizontal direction of the image data is defined as the number of the horizontal pixels. Further, the number of lines in the vertical direction of the image is defined as the number of the vertical lines. The image data of each of the pixels in the horizontal direction is stored in the storage area of the memory 22 designated by the address updated based on the starting address of each of the lines in the horizontal direction.

The ending address of one line in the horizontal direction may not be continued to the starting address of the succeeding line, and a difference between the starting address of one line and the starting address of the succeeding line is defined as an offset address. Note that, if the ending address of one line is continued to the starting address of the succeeding line, the offset address becomes zero.

In the control register not shown of the display controller 20, mirror function enabled information is set as the information for designating whether or not the mirror reflection process is executed. Further, in the control register, rotational angle information is set as the information for setting the rotational angle.

The host 10 further designates in the control register the read starting address and the offset address of the memory 22 in accordance with the rotational angle and the mirror function enabled information.

FIGS. 10A through 10D, and 11A through 11D are schematic views for explaining an example of setting the read starting address and the offset address in accordance with the rotational angle and the mirror function enabled information. Here, the appearances of the rotated images are schematically illustrated.

Figure 10A:
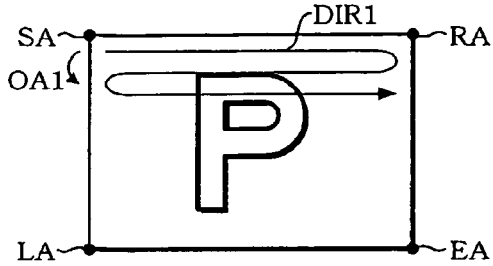
FIGS. 10A through 10D are schematic views for explaining an example of setting the read starting address and the offset address in accordance with the rotational angle and the mirror function enabled information.

FIG. 10A schematically shows the read starting address, a direction of updating the reading address, and the offset address when the rotational angle is 0 degree, and the mirror function is set to the disable state (OFF). In this case, since the orientation of the rotated image is the same as the original, the upper left address is set as the read starting address SA, and the reading address is updated along the updating direction DIR1. When the reading address reaches the ending address in the updating direction, the starting position of the reading address of the succeeding line is obtained using the offset address OA1. The one line of pixels thus read out is set as one line of pixels in the horizontal direction of the rotated image.

Figure 10B:
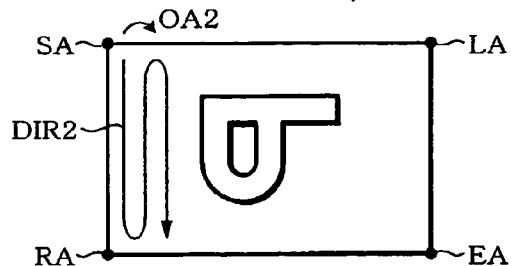

FIG. 10B schematically shows the read starting address, a direction of updating the reading address, and the offset address when the rotational angle is 90 degree, and the mirror function is set to the enable state (ON). In this case, the upper left address is set as the read starting address SA, and the reading address is updated along the updating direction DIR2. When the reading address reaches the ending address in the updating direction, the starting position of the reading address of the succeeding line is obtained using the offset address OA2. The one line of pixels thus read out is set as one line of pixels in the horizontal direction of the rotated image.

Figure 10C:
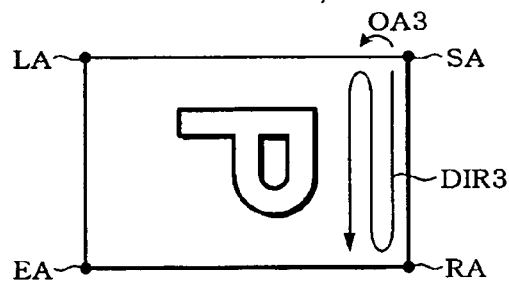

FIG. 10C schematically shows the read starting address, a direction of updating the reading address, and the offset address when the rotational angle is 90 degree, and the mirror function is set to the disable state.

Figure 10D:
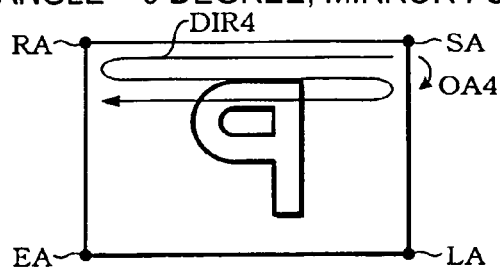

FIG. 10D schematically shows the read starting address, a direction of updating the reading address, and the offset address when the rotational angle is 0 degree, and the mirror function is set to the enable state.

Figure 11A:
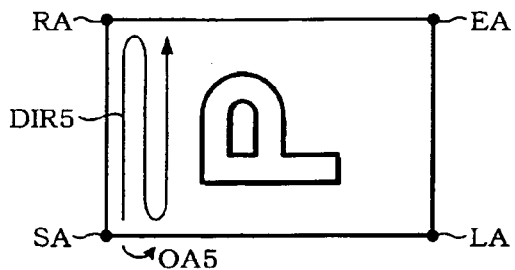
FIGS. 11A through 11D are schematic views for explaining an example of setting the read starting address and the offset address in accordance with the rotational angle and the mirror function enabled information.

FIG. 11A schematically shows the read starting address, a direction of updating the reading address, and the offset address when the rotational angle is 270 degree, and the mirror function is set to the disable state.

Figure 11B:
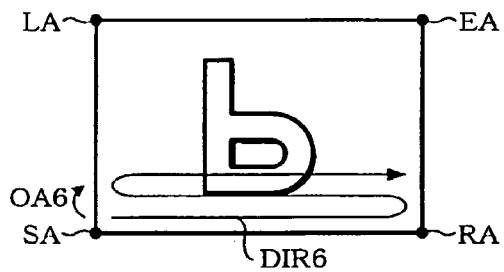

FIG. 11B schematically shows the read starting address, a direction of updating the reading address, and the offset address when the rotational angle is 180 degree, and the mirror function is set to the enable state.

Figure 11C:
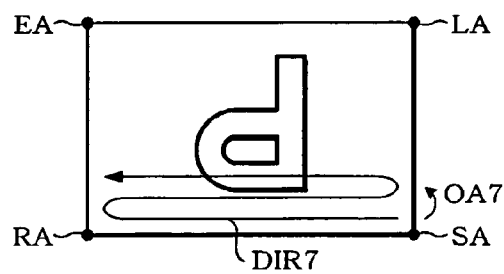

FIG. 11C schematically shows the read starting address, a direction of updating the reading address, and the offset address when the rotational angle is 180 degree, and the mirror function is set to the disable state.

Figure 11D:
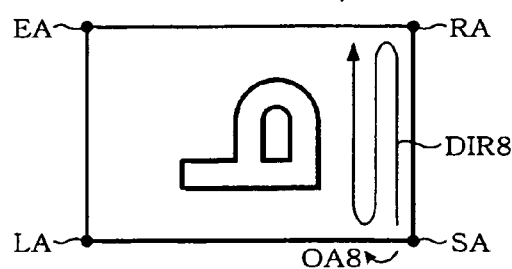

FIG. 11D schematically shows the read starting address, a direction of updating the reading address, and the offset address when the rotational angle is 270 degree, and the mirror function is set to the enable state.

With regard to the cases in FIGS. 10C, 10D and 11A through 11D, the reading address is obtained in the same manner as described in the cases of FIGS. 10A and 10B, and the one line of pixels thus read out is set as one line of pixels in the horizontal direction of the rotated image.

Figure 12:
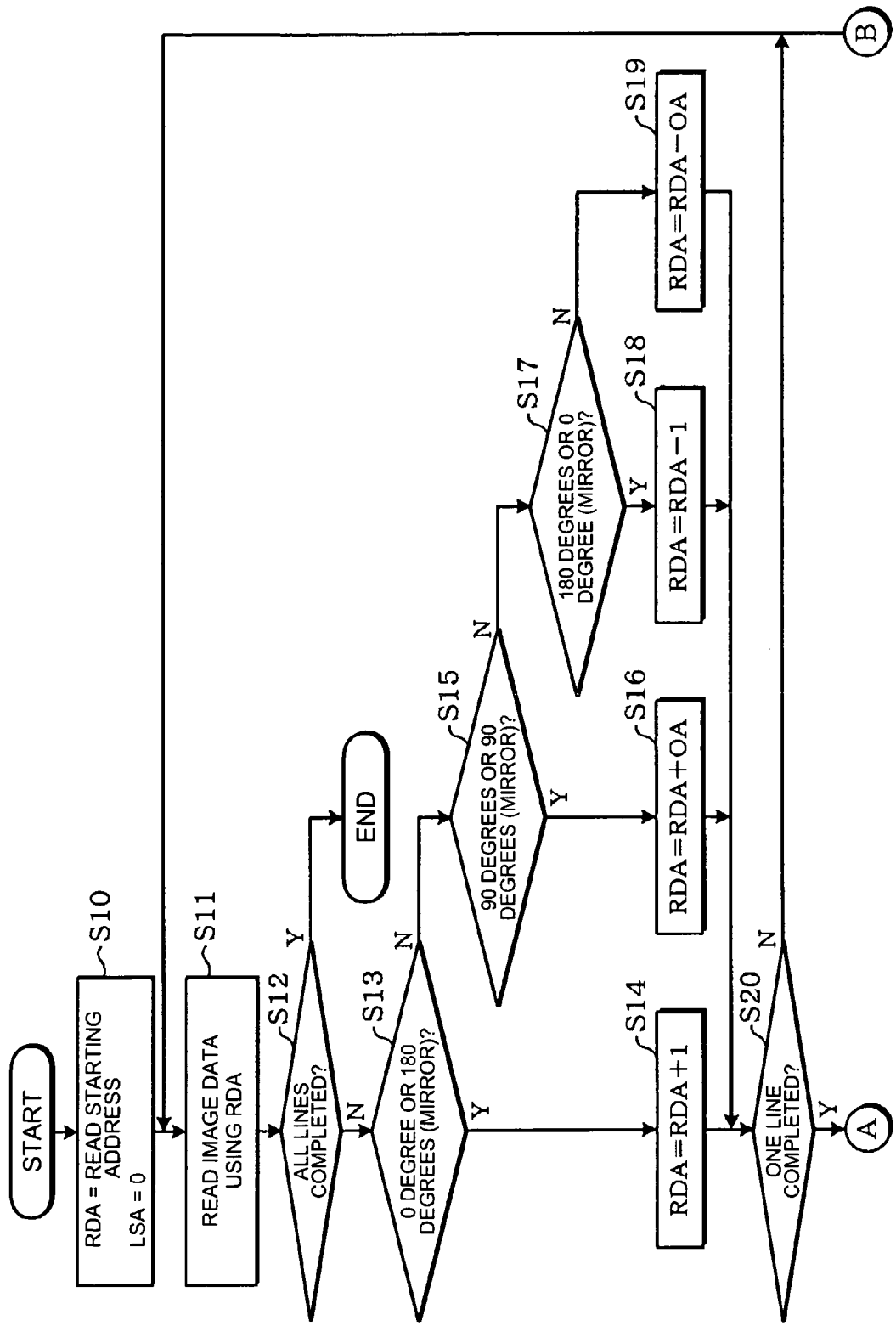
FIG. 12 is a flowchart illustrating the first half of the operational flow of the rotation control section shown in FIG. 2.
Figure 13:
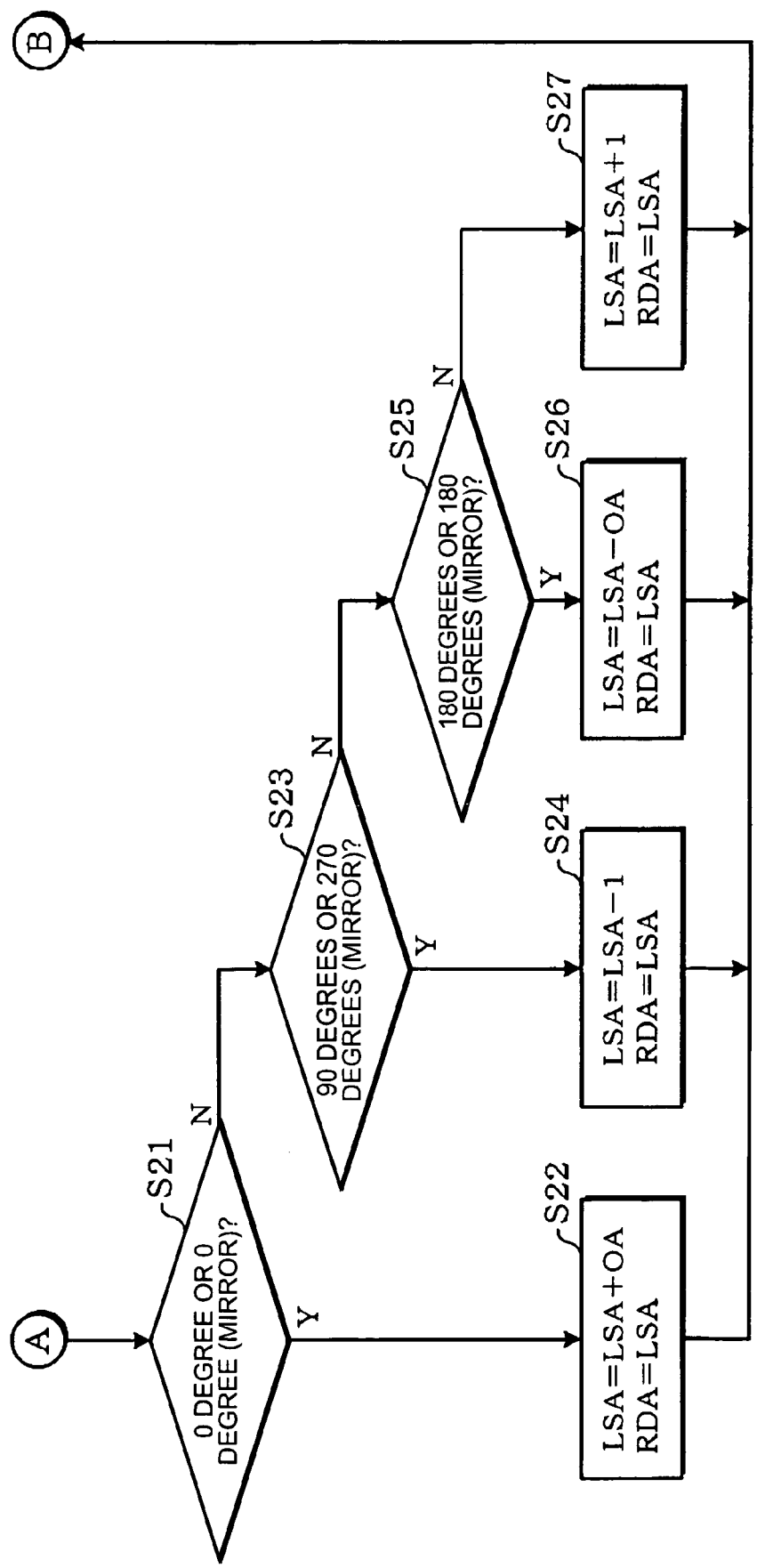
FIG. 13 is a flowchart illustrating the second half of the operational flow of the rotation control section shown in FIG. 2.

FIGS. 12 and 13 show an operational flow of the rotation control section 40 shown in FIG. 2. Here, for the sake of convenience, it is assumed that the image data for one pixel is stored in a storage area designated by a single address.

Further, in the following sections, only the rotational angle is mentioned regarding the rotational angle and the state of the enable information of the mirror function, and a simplified expression of "(mirror)" is added after the rotational angle only in case the mirror function is in the enabled state. For example, "0 degree" denotes that the rotational angle is 0 degree and the mirror function is in the disabled state, and "180 degree (mirror)" denotes that the rotational angle is 180 degree and the mirror function is in the enabled state.

Firstly, as shown in FIGS. 10A through 10D and 11A through 11D, the read starting address set by the host in accordance with the rotational angle and the mirror function enabled information is set to the reading address RDA, and a parameter LSA is initialized to 0 (step S10).

Subsequently, the image data is read out from the memory 22 using the reading address RDA (step S11).

If reading of all of the lines is completed (step S12: Y), the series of processes is terminated (END).

If reading of all of the lines is not completed in the step S12 (step 12: N), whether or not "0 degree" or "180 degree (mirror)" is set is judged (step S13).

In the step S13, if it is judged that "0 degree" or "180 degree (mirror)" is set (step S13: Y), the reading address RDA is incremented by one address to update the reading address RDA (step S14).

In the step S13, if it is not judged that "0 degree" or "180 degree (mirror)" is set (step S13: N), whether or not "90 degree" or "90 degree (mirror)" is set is judged (step S15).

In the step S13, if it is judged that "90 degree" or "90 degree (mirror)" is set (step S15: Y), the reading address RDA is added with the offset address OA to update the reading address RDA (step S16). In this case, the offset address OA is set by the host in accordance with the rotational angle and the mirror function enabled information as shown in FIGS. 10A through 10D and 11A through 11D.

In the step S15, if it is not judged that "90 degree" or "90 degree (mirror)" is set (step S15: N), whether or not "180 degree" or "0 degree (mirror)" is set is judged (step S17).

In the step S17, if it is judged that "180 degree" or "0 degree (mirror)" is set (step S17: Y), the reading address RDA is decremented by one address to update the reading address RDA (step S18).

In the step S17, if it is not judged that "180 degree" or "0 degree (mirror)" is set (step S17: N), it is judged that "270 degree" or "270 degree (mirror)" is set. And, the offset address OA is subtracted from the reading address RDA to update the reading address RDA (step S19).

Following the steps S14, S16, S18, and S19, whether or not reading of one line is completed is judged (step S20). If it is judged that reading of one line is not completed (step S20: N), the control goes back to the step S11 to continue reading the image data.

In the step S20, if it is judged that reading of one line is completed (step S20: Y), whether or not "0 degree" or "0 degree (mirror)" is set is judged (step S21).

In the step S21, if it is judged that "0 degree" or "0 degree (mirror)" is set (step S21: Y), the parameter LSA is added with the offset address OA to update the parameter LSA, and the parameter LSA is then set to the reading address RDA (step S22). And, the control goes back to the step S11.

In the step S21, if it is not judged that "0 degree" or "0 degree (mirror)" is set (step S21: N), whether or not "90 degree" or "270 degree (mirror)" is set is judged (step S23).

In the step S23, if it is judged that "90 degree" or "270 degree (mirror)" is set (step S23: Y), the parameter LSA is decremented by one address to update the parameter LSA, and the parameter LSA is then set to the reading address RDA (step S24). And, the control goes back to the step S11.

In the step S23, if it is not judged that "90 degree" or "270 degree (mirror)" is set (step S23: N), whether or not "180 degree" or "180 degree (mirror)" is set is judged (step S25).

In the step S25, if it is judged that "180 degree" or "180 degree (mirror)" is set (step S25: Y), the offset address OA is subtracted from the parameter LSA to update the parameter LSA, and the parameter LSA is then set to the reading address RDA (step S26). And, the control goes back to the step S11.

In the step S25, if it is not judged that "180 degree" or "180 degree (mirror)" is set (step S25: N), it is judged that "270 degree" or "90 degree (mirror)" is set. And, the parameter is incremented by one address to update the parameter LSA, and the parameter LSA is set to the reading address RDA (step S27). And, the control goes back to the step S11.

The reading control circuit 34 performs control for reading out the image data from the memory 22 using the reading address RDA thus set by the rotation control section 40 described above.

Note that, although the description is made assuming that the rotation control section 40 performs both of the process of rotating the image orientation and the mirror reflection process in FIGS. 9, 10A through 10D, 11A through 11D, 12, and 13, the rotation control section 40 can be a section that performs at least one of the rotation process and the mirror reflection process.

Although, in the present embodiment described above, the memory address control section 36 updates the writing area and the reading area, it is not thus limited. In a modified example of the present embodiment, the host 10 directly sets the writing area and the reading area.

Figure 14:
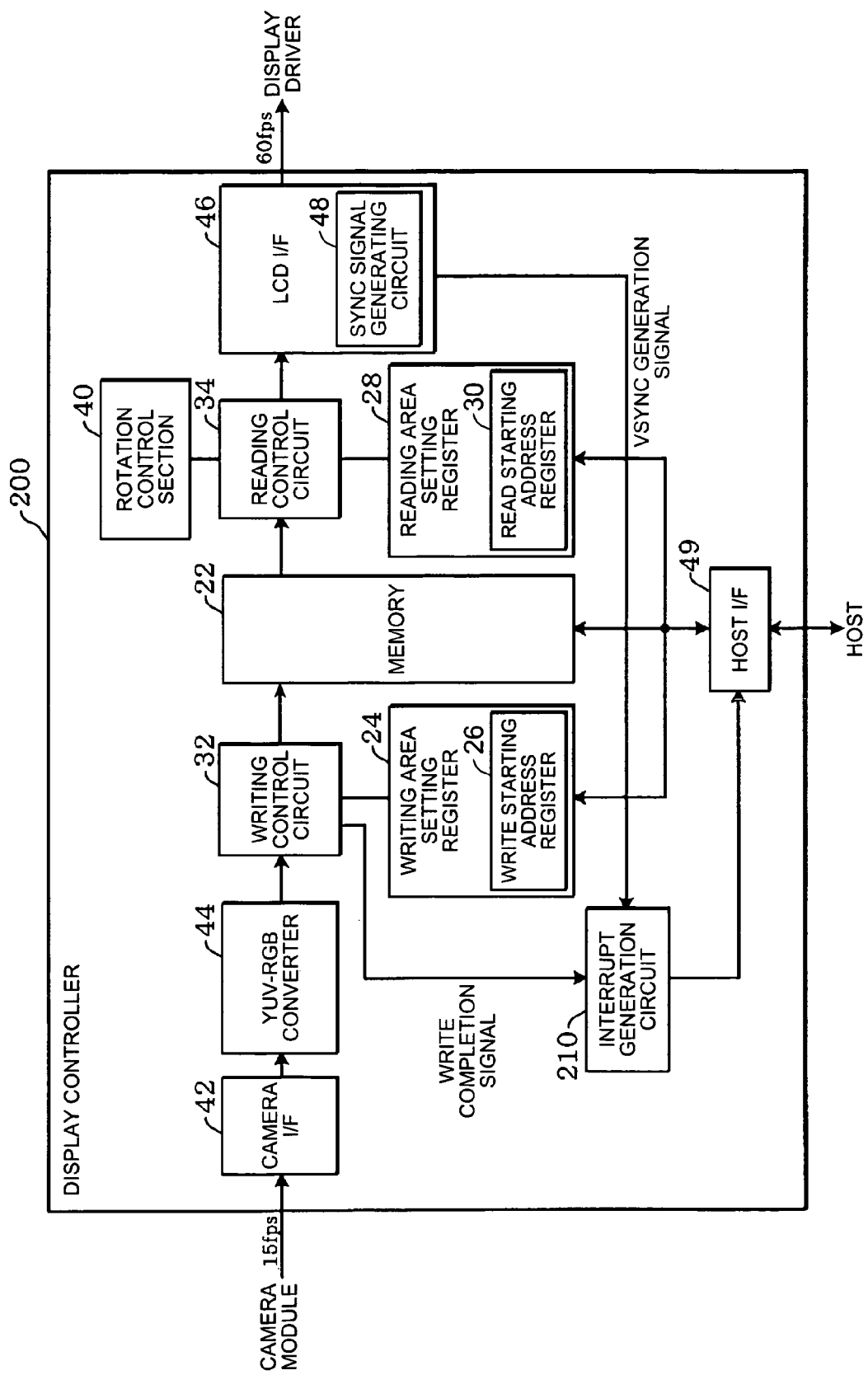
FIG. 14 is a block diagram of a configuration example of a display controller of a modified example of the present embodiment.

FIG. 14 shows a block diagram of a configuration example of a display controller according to a modified example of the present embodiment. Note that the same parts as those of the display controller 20 shown in FIG. 2 are denoted with the same reference numerals and explanations therefore are omitted if appropriate. The display controller 200 in the modified example can also be applied to the display system shown in FIG. 1.

The different point of the display controller 200 from the display controller 20 shown in FIG. 2 is that it is equipped with an interrupt generation circuit 210 instead of the memory address control section 36. And, the interrupt generation circuit 210 reports a write completion interrupt (a first interrupt) to the host 10 via the host I/F circuit 49 in response to the pulse of the write completion signal from the writing control circuit 32. Further, the interrupt generation circuit 210 reports a VSYNC generation interrupt (a second interrupt) to the host 10 via the host I/F circuit 49 in response to the pulse of the VSYNC generation signal from the sync signal generation circuit 48.

And, the host 10 reported with these interrupts updates the setting values of the writing area setting register 24 (the write starting address register 26) and the reading area setting register 28 (the read starting address register 30) via the host I/F circuit 49.

Figure 15:
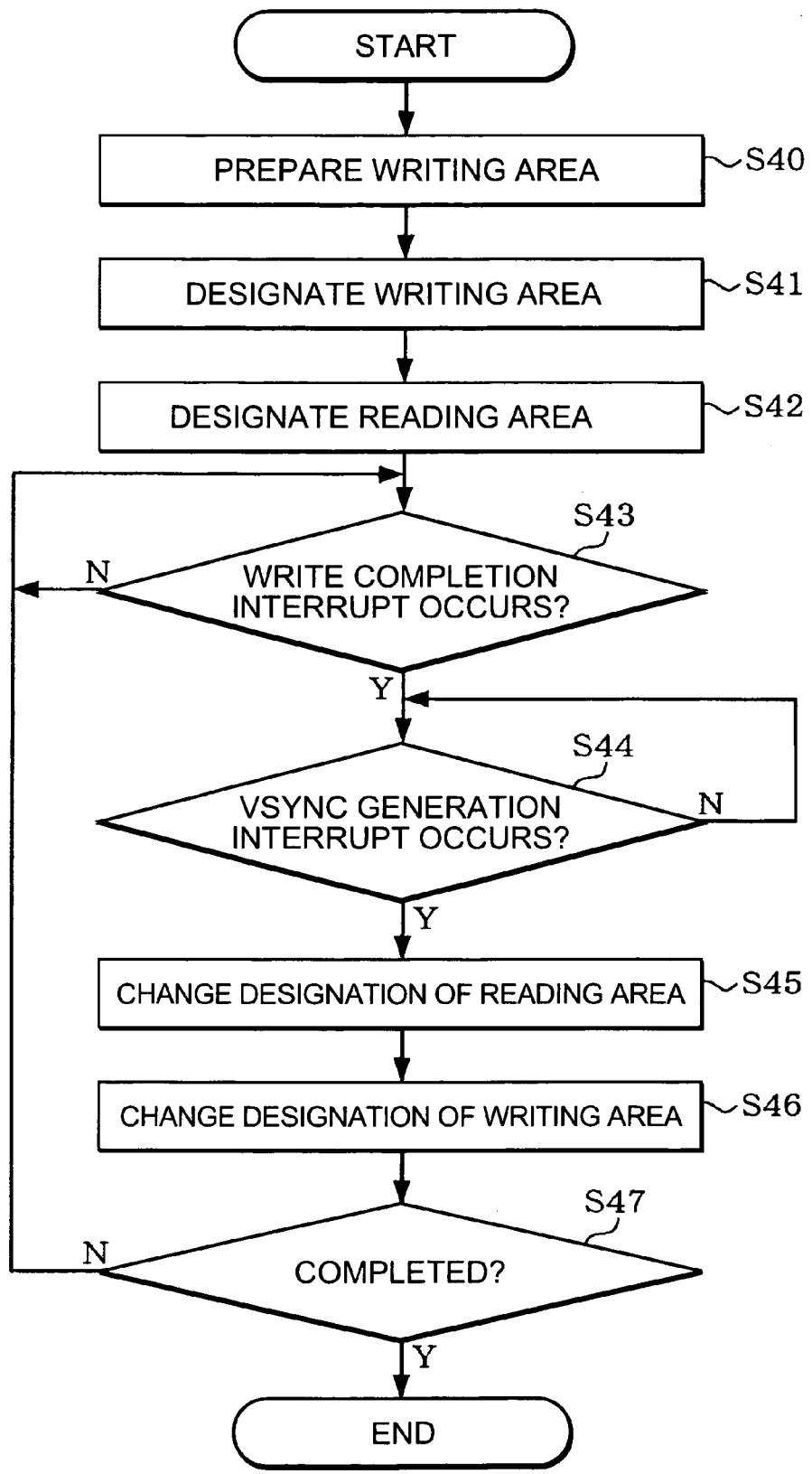
FIG. 15 shows a flow chart of a processing example of a host performing processes including an update process of a write starting address of a display controller of the modified example.

FIG. 15 shows a flowchart of a processing example of the host 10 that performs processes including the update process of the write starting address of the display controller 200 in the modified example.

A program for realizing the process shown in FIG. 15 is stored in the memory of the host 10. The CPU of the host 10 realizes the process shown in FIG. 15 after retrieving the program.

Firstly, the host 10 performs a process for preparing the writing area in the memory 22 (step S40). And then, the host 10 designates the writing area (step S41). For example, the host 10 prepares three frames of writing area as shown in FIG. 5. And, the host 10 sets the write starting address for the one frame of writing area and the size thereof to the writing area setting register 24 of the display controller 200.

Subsequently, the host 10 designates the reading area (step S42). For example, the host 10 sets the read starting address and the size thereof to the reading area setting register 28 of the display controller 200.

After then, the host 10 watches presence or absence of the write completion interrupt from the display controller 200 (step S43: N). When the host 10 is reported with the write completion interrupt from the display controller 200 (step S43: Y), the host 10 further watches presence or absence of the VSYNC generation interrupt from the display controller 200 (step S44: N).

When the host 10 is reported with the VSYNC generation interrupt from the display controller 200 (step S44: Y), the host 10 provides the reading area setting register 28 with information having the same content as the setting information of the present writing area which is set to the writing area setting register 24 via the host I/F circuit 49 to alter the designation of the reading area (step S45).

Subsequently, the host 10 provides the writing area setting register 24 with the write starting address and the size of the writing area previously assigned as the writing area for the image data of the succeeding frame to the present frame to alter the designation of the writing area (step S46).

Here, when the process is terminated with a predetermined termination conditions (step S47: Y), the host 10 terminates a series of processes (END). On the contrary, when the process is not terminated because the predetermined termination conditions are not satisfied (step S47: N), the control goes back to the step S43.

Note that the processes in the steps S40 through S42 shown in FIG. 15 are common to the processes of the host 10 connected to the display controller 20 shown in FIG. 2. Further, the designation of the writing area in the step S46 can be carried out not only by the host 10 but also by a hardware circuit of the display controller 200 updating with the setting information of the writing area previously prepared.

Figure 16:
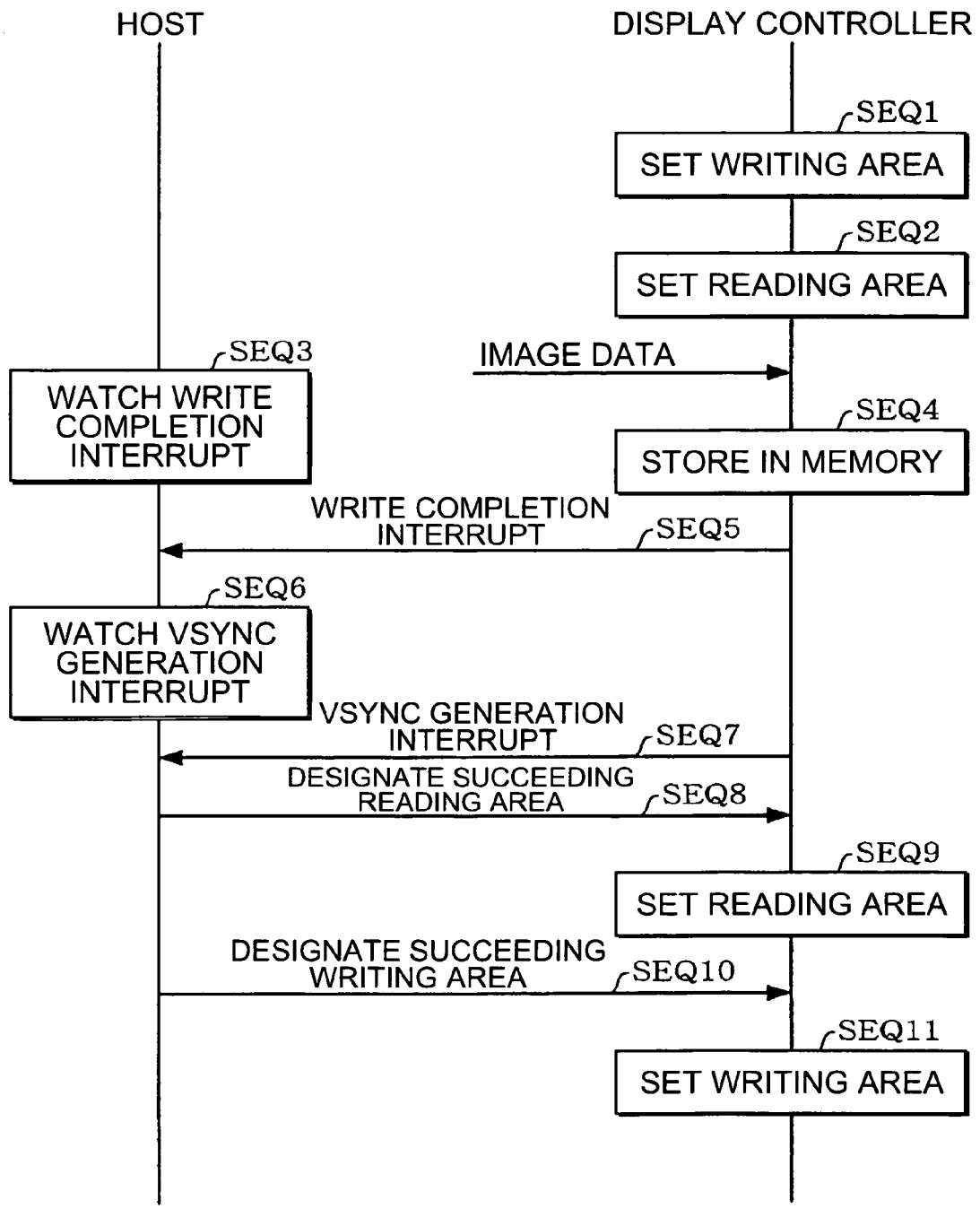
FIG. 16 is a sequence diagram of an operational example of the host and the display controller in the modified example.

FIG. 16 shows a sequence diagram of an operational example of the host 10 and the display controller 200.

In FIG. 16, it is assumed that setting (SEQ1) of the writing area and setting (SEQ2) of the reading area are executed previously by the processes of the host 10 shown in the steps S40 through S42 in FIG. 15. And, the host 10 watches (SEQ3) presence or absence of the write completion interrupt from the display controller 200 after executing in the display controller 200 setting (SEQ1) of the writing area and setting (SEQ2) of the reading area.

To the display controller 200 in which setting (SEQ1) of the writing area and setting (SEQ2) of the reading area are executed, image data is input from the camera module and then stored (SEQ4) in the writing area set in SEQ1. Meanwhile, image data is read out from the reading area set in SEQ2 and supplied to the display driver.

When writing of one frame of image data to the memory 22 from the camera module is completed, the write completion interrupt is reported (SEQ5) to the host 10.

When the host 10, watching presence or absence of the write completion interrupt, detects the report of the write completion interrupt from the display controller 200, the host 10 subsequently watches (SEQ6) presence or absence of the VSYNC generation interrupt.

When the interrupt generation circuit 210 receives the VSYNC generation signal once or plural times after the display controller 200 reports the write completion interrupt to the host, the interrupt generation circuit 210 reports (SEQ7) the VSYNC interrupt to the host 10.

When the host 10, watching presence or absence of the VSYNC generation interrupt, detects the report of the VSYNC generation interrupt from the display controller 200, the host 10 designates (SEQ8) the succeeding reading area. Thus, the succeeding reading area is set (SEQ9) in the reading area setting register 28 of the display controller 200. Subsequently, the host 10 designates (SEQ10) the succeeding writing area. Thus, the succeeding writing area is set (SEQ11) in the writing area setting register 24 of the display controller 200.

Figure 17:
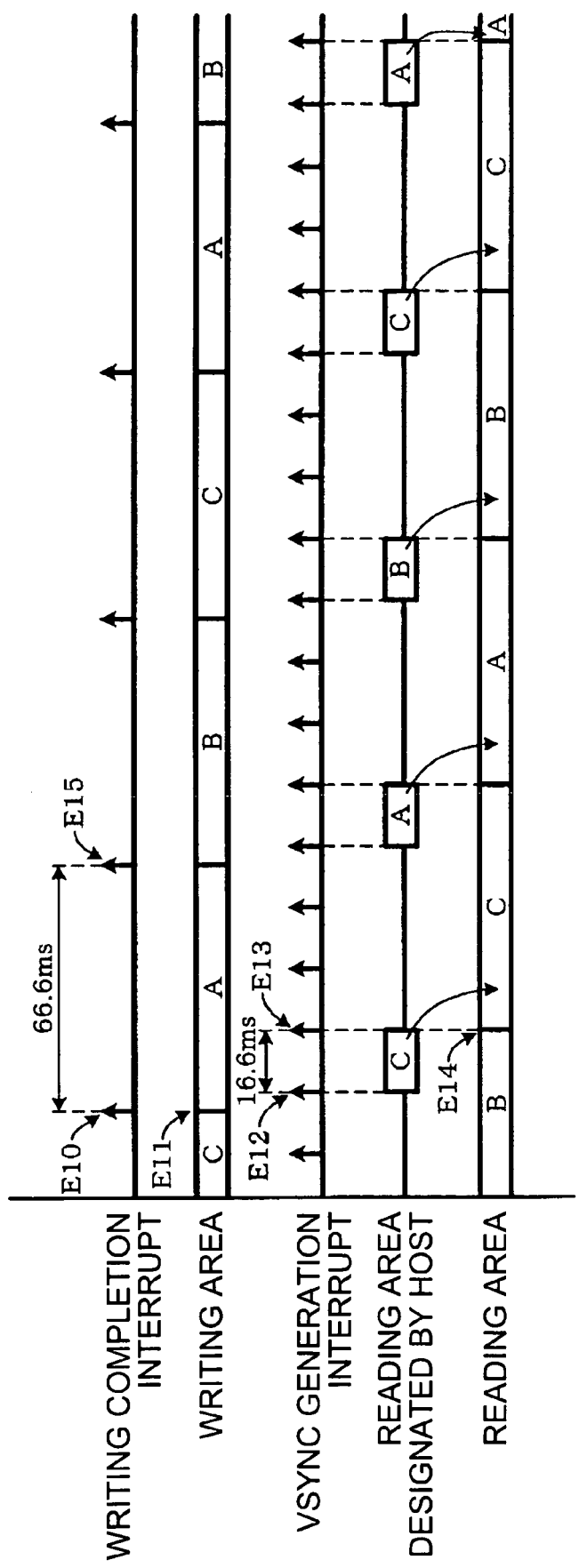
FIG. 17 is a timing chart of an operational example of the display controller of the modified example.

FIG. 17 shows a timing chart of an operational example of the display controller 200 according to the modified example.

In FIG. 17, similarly to those in FIG. 6, it is assumed that the image data is written to the memory 22 from the camera module at a rate of 15 fps, and the image data is read out from the memory 22 at a rate of 60 fps.

The writing control circuit 32 generates the write completion signals, which show that writing of one frame of image data to the writing area of the memory 22 is completed, in every 66.6 (=1000/16) millisecond. The interrupt generation circuit 210 reports the write completion interrupt to the host 10 when receiving the write completion signal.

Further, the sync signal generation circuit 48 generates pulses of a VSYNC generation signal, which shows that the vertical sync signal VSYNC for displaying becomes active, in every 16.6 (=1000/60) millisecond. The interrupt generation circuit 210 reports the VSYNC generation interrupt to the host 10 when receiving the pulse of the VSYNC generation signal once or plural times.

Here, it is assumed that the writing areas A, B, and C of the memory 22 are respectively provided. When writing of one frame of image data to the writing area C is completed, the write completion interrupt E10 is generated. The writing area is changed to the area A by the write completion interrupt signal for causing the write completion interrupt E10 (E11). Here, it is assumed that the writing area is changed not by the host 10 but by the hardware circuit in the display controller 200.

In response to the pulse E12 of the VSYNC generation signal generated immediately after generation of the write completion interrupt E10, the host 10 sets the write starting address and the size of the writing area to which writing is completed as the read starting address and the size of the succeeding reading area. At this moment, in preparation for the case in which the display controller needs to be accessed plural times for setting the read starting address and the size, the host 10 sets the read starting address and the size of the updated reading area to the reading area setting register 28 in response to a pulse E13 of the VSYNC generation signal succeeding the pulse E12 of the VSYNC generation signal.

After then, the image data from the reading area C is repeatedly output to the display driver 50 until reading of the one frame of image data from the reading area C designated by the read starting address is completed. Note that, since the rate of writing one frame of image data to the memory 22 is lower than the rate of reading out the rotated image data from the memory 22 in FIG. 17, the reading area is not updated until the succeeding write completion interrupt E15 is generated.

According to the above processes, the area to which writing is completed is sequentially updated as the reading area.

Electronic Instrument

Figure 18:
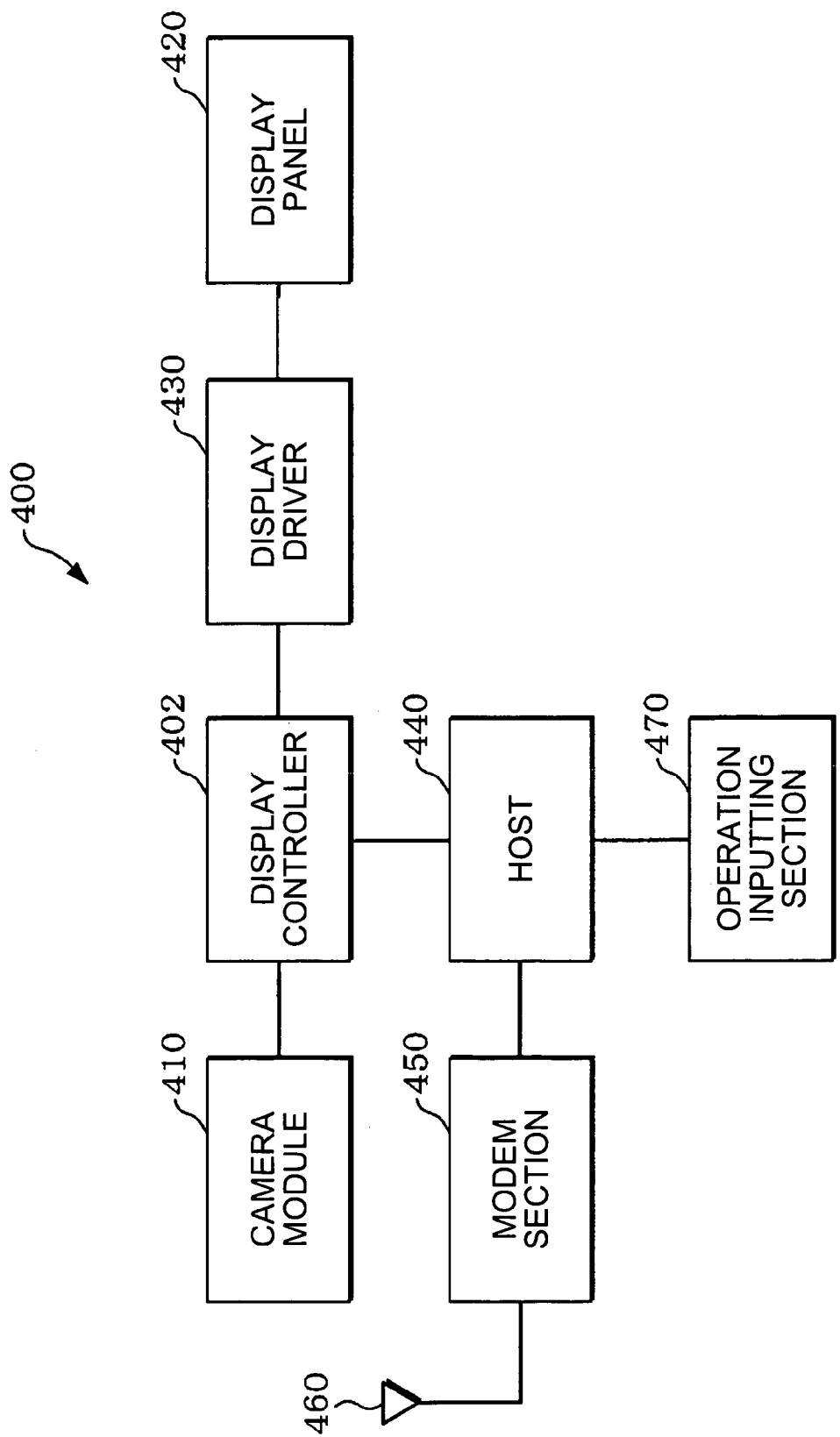
FIG. 18 is a block diagram of a configuration example of an electronic instrument applying the display controller of the present embodiment or the modified example thereof.

FIG. 18 shows a block diagram of a configuration example of an electronic instrument applying the display controller according to the present embodiment or the modified example thereof. Here, a block diagram of a configuration example of a mobile phone is described as the electronic instrument.

The mobile phone 400 includes a camera module 410. The camera module 410 includes a CCD camera, and supplies the display controller 402 with image data picked-up by the CCD camera in the YUV format. As the display controller 402, the display controller according to the present embodiment or the modified example thereof can be adopted.

The mobile phone 400 includes a display panel 420. A liquid crystal display panel can be adopted as the display panel 420. In this case, the display panel 420 is driven by a display driver 430. The display panel 420 includes a plurality of scanning lines, a plurality of data lines, and a plurality of pixels. The display driver 430 has a function of a scanning driver for selecting the scanning line(s) from the plurality of scanning lines in increments of one or more of scanning lines, as well as a function of a data driver for supplying the data lines with voltages corresponding to image data.

The display controller 402 is connected to the display driver 430, and supplies the display driver 430 with image data of RGB format.

A host 440 is connected to the display controller 402. The host 440 controls the display controller 402. Further, the host 440 can supply the display controller 402 with the image data received via an antenna 460 and then demodulated by a modem section 450. The display controller 402 makes the display driver 430 display on the display panel 420 based on the image data.

After the image data generated by the camera module 410 are modulated by the modem section 450, the host 440 can instruct to transmit them to another communication device via the antenna 460.

The host 440 executes a process of transmitting or receiving image data, image picking-up by the camera module 410, and a process of displaying on the display panel in accordance with the operation information from an operation inputting section 470.

Note that, although the liquid crystal display panel is described as an example of the display panel 420 in FIG. 18, it is not so limited. The display panel 420 can be an electroluminescence or a plasma display device, and applied to the display controller for supplying the image data to the display drivers for driving these panels.

Note that the present invention is not limited to the embodiment described above, but can be put into practice with various modification within the scope or the spirit of the present invention. For example, since the setting value of the reading area setting register 28 (the read starting address register 30) is updated with the setting value of the writing area setting register 24 (write starting address register 26), the process can also be carried out by a hardware circuit of the display controller in the present embodiment or the modified example thereof without intervening the host.

Further, in the aspects of the present invention corresponding to the dependent claims, configurations lacking a part of elements of the independent claim thereof can also be adopted. Further, a substantial part of one independent claim can be dependent from another independent claim.

What is claimed is:

1. A display controller for supplying image data to a display driver for driving a display panel, comprising:
    a memory storing at least three frames of image data;
    a write starting address register to which a write starting address for writing image data in the memory is set;
    a read starting address register to which a read starting address for reading out image data to be supplied to the display driver from the memory is set; and
    a rotation control section performing control that reads out image data obtained by rotating the orientation of an image by reading out image data for each pixel stored in the memory in an order corresponding to the rotational angle,
    the at least three frames being stored in three areas of the memory including a first frame memory area, a second frame memory area, and a third frame memory area,
    when writing of first image data to the first frame memory area designated by a first write starting address is completed, the first write starting address set in the write starting address register being updated with a second write starting address for writing second image data of the second frame memory area that is a succeeding frame to a frame of the first image data, and the previous value of the first write starting address being set to the read starting address register as a first read starting address,
    the display controller writing third image data to the third frame memory area after writing the second image data to the second frame memory area, and
    image data corresponding to the rotated image and read out by the rotation control section from the third frame memory area designated by the first read starting address being supplied to the display driver during a period that includes both a first period for reading the first frame memory area and a second period for reading the second frame period.

2. The display controller according to claim 1,
    the first read starting address not being updated until reading of one frame of image data from the first frame memory area of the memory designated by the first read starting address is completed.

3. The display controller according to claim 1, further comprising:
    a sync signal generation circuit generating a vertical sync signal defining a scanning period of one frame, wherein
    when the image data is supplied to the display driver in sync with the vertical sync signal, the previous value of the first write starting address being set to the read starting address register as the first read starting address in sync with the vertical sync signal upon completion of writing of the first image data.

4. The display controller according to claim 3, providing the vertical sync signal becomes active at least two times after completion of writing of the first image data, the previous value of the first write starting address being set to the read starting address register as the first read starting address.

5. The display controller according to claim 3, a rate of writing one frame of image data to the memory being lower than a rate of reading out the rotated image data from the memory.

6. The display controller according to claim 1, the write starting address being set in the write starting address register for each writing area of the memory and either one of the write starting addresses is selected upon writing the first image data.

7. The display controller according to claim 1, further comprising:
a host interface performing an interfacing process with a host,
a first interrupt indicating completion of writing of the first image data is reported to the host, and
the previous value of the first write starting address being supplied as the first read starting address by the host reported with the first interrupt via the host interface.

8. The display controller according to claim 7, the first write starting address being supplied by the host reported with the first interrupt via the host interface.

9. The display controller according to claim 7, a second interrupt indicating that the vertical sync signal becomes active is reported to the host, and
providing the first and the second interrupts are reported, the previous value of the first write starting address being supplied as the first read starting address by the host via the host interface.

10. The display controller according to claim 1, further comprising:
a display driver interface for supplying the display driver with image data read out from the memory.

11. An electronic instrument, comprising:
a display panel;
the display controller according to claim 1; and
a display driver driving the display panel in accordance with image data supplied by the display controller.

12. The electronic instrument according to claim 11, further comprising:
a host inputting/outputting image data from/to the display controller.

13. A method of supplying image data to a display driver for driving a display panel, comprising:
writing first image data to a first frame memory area of a memory storing at least three frames of image data in three areas of the memory, including the first frame memory area, a second frame memory area, and a third frame memory area, the area of the memory being designated by a write starting address set in a write starting address register;
setting the first write starting address to a read starting address register upon completion of writing of the first image data, the read starting address register storing a first read starting address for reading out from the memory image data to be supplied to the display driver; and
reading out image data of each pixel from an area of the memory designated by the first read starting address set in the read starting address register in an order corresponding to a rotational angle to supply to the display driver as rotated image data obtained by rotating the orientation of an image;
updating the first write starting address with a second write starting address for writing second image data of the second frame memory area that is a succeeding frame to a frame of the first image data when writing of the first image data to the first frame memory area designated by the first write starting address is completed:
writing third image data to the third frame memory area after writing the second image data to the second frame memory area;
supplying the rotated image data to the display driver during a period that includes both a first period for reading the first frame memory area and a second period for reading the second frame period.

14. The method according to claim 13, the first read starting address not being updated until reading of one frame of image data from the area of the memory designated by the first read starting address is completed.

15. The method according to claim 13, if the image data is supplied to the display driver in sync with a vertical sync signal defining a scanning period of one frame, the first write starting address is set to the read starting address register as the first read starting address in sync with the vertical sync signal upon completion of writing of the image data.

16. The method according to claim 15, when the vertical sync signal becomes active at least two times after completion of writing of the image data, the first write starting address is set to the read starting address register as the first read starting address.

17. The method according to claim 15, a rate of writing one frame of image data to the memory being lower than a rate of reading out the rotated image data from the memory.

18. A display controller that supplies image data to a display driver for driving a display panel, comprising:
a memory that stores at least three frames of image data in at least three areas of the memory including a first frame memory area, a second frame memory area, and a third frame memory area;
a writing area setting register to which a writing area setting address for writing image data in the memory is set;
a reading area setting register to which a reading area setting address for reading out image data to be supplied to the display driver from the memory is set; and
a rotation control section performing control that accesses image data obtained by rotating the orientation of an image by accessing image data in the memory in an order corresponding to the rotation angle, wherein
when writing of first image data to the first frame memory area designated by a first writing area setting address is completed, the first writing area setting address set in the writing area setting register being updated with a second writing area setting address for writing image data of the second frame memory area that is a succeeding frame to a frame of the first image data, and the previous value of the first writing area setting address being set to the reading area setting register as a first reading area setting address, and
image data corresponding to the rotated image and read out by the rotation control section from the first frame memory area designated by the first reading area setting address being supplied to the display driver.

* * * * *